US011528069B2

(12) United States Patent
Lee et al.

(10) Patent No.: US 11,528,069 B2
(45) Date of Patent: Dec. 13, 2022

(54) METHOD FOR CHANNEL STATE INFORMATION REPORTING IN MASSIVE ANTENNA SYSTEM

(71) Applicant: IDAC Holdings, Inc., Wilmington, DE (US)

(72) Inventors: Moon-il Lee, Melville, NY (US); Oghenekome Oteri, San Diego, CA (US); Afshin Haghighat, Ile-Bizard (CA); Erdem Bala, East Meadow, NY (US); Liangping Ma, San Diego, CA (US); Kyle Jung-Lin Pan, Saint James, NY (US); Robert L. Olesen, Huntington, NY (US); Loic Canonne-Velasquez, Verdun (CA)

(73) Assignee: IDAC Holdings, Inc., Wilmington, DE (US)

( * ) Notice: Subject to any disclaimer, the term of this patent is extended or adjusted under 35 U.S.C. 154(b) by 440 days.

(21) Appl. No.: 16/322,875

(22) PCT Filed: Aug. 10, 2017

(86) PCT No.: PCT/US2017/046350
§ 371 (c)(1),
(2) Date: Feb. 1, 2019

(87) PCT Pub. No.: WO2018/031807
PCT Pub. Date: Feb. 15, 2018

(65) Prior Publication Data
US 2021/0344397 A1 Nov. 4, 2021

Related U.S. Application Data

(60) Provisional application No. 62/454,555, filed on Feb. 3, 2017, provisional application No. 62/373,206, filed on Aug. 10, 2016.

(51) Int. Cl.
*H04J 1/16* (2006.01)
*H04L 1/00* (2006.01)
(Continued)

(52) U.S. Cl.
CPC ......... *H04B 7/0626* (2013.01); *H04L 5/0048* (2013.01); *H04W 72/042* (2013.01)

(58) Field of Classification Search
CPC ... H04B 7/0626; H04L 5/0048; H04W 72/042
(Continued)

(56) References Cited

U.S. PATENT DOCUMENTS

2015/0078271 A1* 3/2015 Kim ................. H04L 5/0051
370/329
2015/0257130 A1* 9/2015 Lee ................. H04L 5/1469
370/336
(Continued)

FOREIGN PATENT DOCUMENTS

CN 104982063 A 10/2015
CN 105103463 A 11/2015
(Continued)

OTHER PUBLICATIONS

Ericson (R1-124020, LS response on antenna ports co-location, Qingdao, China, Aug. 13-17, 2012 ) (Year: 2012).*
(Continued)

*Primary Examiner* — Maharishi V Khirodhar
(74) *Attorney, Agent, or Firm* — Julian F. Santos

(57) ABSTRACT

Embodiments described herein provide systems and methods for reference signal configuration for multiple panels with panel-specific channel state information reference signals (CSI-RS) configurations and quasi-collocation (QCL) indication, including QCL type definition and indication for panel-specific CSI-RS configurations. Exemplary embodiments further provide multi-component precoder structure
(Continued)

with panel specific component precoder and panel common precoder. Embodiments include: (semi)-open-loop schemes using random precoding for panel common precoder and/or panel specific precoder; panel selection/restriction with panel common precoder; MU-MIMO operation using different set of panels; and panel-wise CSI reporting.

20 Claims, 15 Drawing Sheets

(51) Int. Cl.
    *H04L 12/16*     (2006.01)
    *H04B 7/06*     (2006.01)
    *H04L 5/00*     (2006.01)
    *H04W 72/04*     (2009.01)

(58) Field of Classification Search
    USPC ......................................................... 370/252
    See application file for complete search history.

(56) References Cited

U.S. PATENT DOCUMENTS

| | | | |
|---|---|---|---|
| 2015/0341099 A1 | 11/2015 | Kang et al. | |
| 2015/0365154 A1 | 12/2015 | Davydov et al. | |
| 2016/0056875 A1 | 2/2016 | Kang et al. | |
| 2019/0045488 A1* | 2/2019 | Park .................. | H04B 7/024 |

FOREIGN PATENT DOCUMENTS

| | | |
|---|---|---|
| CN | 105122869 A | 12/2015 |
| EP | 2905910 A1 | 8/2015 |

OTHER PUBLICATIONS

Third Generation Partnership Project, "Technical Specification Group Radio Access Network; Evolved Universal Terrestrial Radio Access (E-UTRA); User Equipment (UE) Procedures in Idle Mode". 3GPP TS 36.304, V12.1.0, (Release 12), Jun. 2014, 35 pages.

Third Generation Partnership Project, "Technical Specification Group Radio Access Network; Evolved Universal Terrestrial Radio Access (E-UTRA); Radio Resource Control (RRC); Protocol Specification". 3GPP TS 36.331, V11.4.0, (Release 11), Jun. 2013, 346 pages.

Ericsson et al: "LS response on antenna ports co-location", 3GPP Draft; R1-124020, 3rd Generation Partnership Project (3GPP), Mobile Competence Centre; F-06921; vol. Ran WG1, No. Qingdao, China; Aug. 13, 2012-Aug. 17, 2012, Sep. 19, 2012 (Sep. 19, 2012), XP050661940, URL: http://www.3gpp.org/ftp/tsg_ran/WG1_RL1/TSGR1_70/LS/Outgoing/.

International Search Report and Written Opinion of the International Searching Authority for PCT/US2017/046350 dated Oct. 25, 2017.

Written Opinion of the International Preliminary Examining Authority for PCT/US2017/046350 dated Jun. 28, 2018.

ZTE: "Quasi Co-Location of Antenna Ports for FD-MIMO", 3GPP Draft; R1-156824, 3rd Generation Partnership Project (3GPP), Mobile Competence Centre, Ran WG1, Nov. 15, 2015.

International Preliminary Report on Patentability for PCT/US2017/046350 completed on Oct. 25, 2018.

3rd Generation Partnership Project, "Physical Channels and Modulation". In Technical Specification Group Radio Access Network; Evolved Universal Terrestrial Radio Access (E-UTRA), (Release 11) 3GPP TS 36.211, V11.4.0, Sep. 2013.

3rd Generation Partnership Project, "Multiplexing and Channel Coding". In Technical Specification Group Radio Access Network; Evolved Universal Terrestrial Radio Access (E-UTRA), (Release 11), 3GPP TS 36.212, V11.3.0, Jun. 2013.

3rd Generation Partnership Project, "Physical Layer Procedures". In Technical Specification Group Radio Access Network; Evolved Universal Terrestrial Radio Access (E-UTRA), (Release 11), 3GPP TS 36.213 V11.4.0, Sep. 2013.

Samsung: "Discussion on QCL assumptions for FD-MIMO", 3GPP Tdoc R1-156779, 3GPP TSG Ran WG1 Meeting #83, Anaheim, CA, USA, Nov. 16-20, 2015, 5 pages.

Ericsson et al., "LS response on antenna ports co-location", 3GPP Tdoc R1-121919, 3GPP TSG-RAN1 Meeting #68bis, Jeju, Korea, Mar. 26-30, 2012, 2 pages.

* cited by examiner

US 11,528,069 B2

METHOD FOR CHANNEL STATE INFORMATION REPORTING IN MASSIVE ANTENNA SYSTEM

CROSS-REFERENCE TO RELATED APPLICATIONS

The present application is a national stage application under 35 U.S.C. 371 of International Application No. PCT/US2017/046350, entitled METHOD FOR CHANNEL STATE INFORMATION REPORTING IN MASSIVE ANTENNA SYSTEM, filed on Aug. 10, 2017, and claims benefit under 35 U. S. C. § 119(e) from U.S. Provisional Patent Application Ser. No. 62/373,206, entitled "METHOD FOR CHANNEL STATE INFORMATION REPORTING IN MASSIVE ANTENNA SYSTEM", filed Aug. 10, 2016, and U.S. Provisional Patent Application Ser. No. 62/454,555, entitled "METHOD FOR CHANNEL STATE INFORMATION REPORTING IN MASSIVE ANTENNA SYSTEM", filed Feb. 3, 2017, which are hereby incorporated by reference in their entirety.

BACKGROUND

Multiple antenna techniques have been designed and developed based on a single panel based antenna configuration. For example, MIMO transmission schemes (e.g., SU-MIMO, MU-MIMO, transmit diversity, open-loop MIMO, and closed-loop MIMO) and its associated channel state information (CSI) feedback have been designed based on the single panel based antenna model.

Massive antenna models include multiple panels. Timing and phase may not be synchronized across panels. As a result, there is a need for multiple antenna techniques that address issues that arise in the context of a massive antenna model using multiple panels.

Precoding is a generalization of beamforming to support multi-stream (or multi-layer) transmission in multi-antenna wireless communications. In conventional single-stream beamforming, the same signal is emitted from each of the transmit antennas with appropriate weighting (phase and gain) such that the signal power is maximized at the receiver output. When the receiver has multiple antennas, single-stream beamforming cannot simultaneously maximize the signal level at all of the receive antennas. In order to maximize the throughput in multiple receive antenna systems, multi-stream transmission is generally required.

In point-to-point systems, precoding means that multiple data streams are emitted from the transmit antennas with independent and appropriate weightings such that the link throughput is maximized at the receiver output. In multi-user MIMO, the data streams are intended for different users (known as SDMA) and some measure of the total throughput (e.g., the sum performance or max-min fairness) is maximized. In point-to-point systems, some of the benefits of precoding can be realized without requiring channel state information at the transmitter, while such information is essential to handle the inter-user interference in multi-user systems. Precoding in the downlink of cellular networks, known as network MIMO or coordinated multipoint (CoMP), is a generalized form of multi-user MIMO that can be analyzed by the same mathematical techniques.

SUMMARY

Embodiments described herein provide systems and methods for reference signal configuration for multiple panels with panel-specific channel state information reference signals (CSI-RS) configurations and quasi-collocation (QCL) indication, including QCL type definition and indication for panel-specific CSI-RS configurations.

Exemplary embodiments further provide multi-component precoder structure with panel specific component precoder and panel common precoder. Embodiments include: (semi)-open-loop schemes using random precoding for panel common precoder and/or panel specific precoder; panel selection/restriction with panel common precoder; MU-MIMO operation using different set of panels; and panel-wise CSI reporting.

Exemplary embodiments provide a hybrid analog and digital precoder for multiple panel based antenna configurations.

Exemplary uplink (UL) feedback channels for panel selection indication are described.

Exemplary embodiments further provide a multi-panel codebook with panel-specific PMI reporting.

BRIEF DESCRIPTION OF THE DRAWINGS

A more detailed understanding may be had from the following description, presented by way of example in conjunction with the accompanying drawings.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Network Architecture.

Figure 1A:
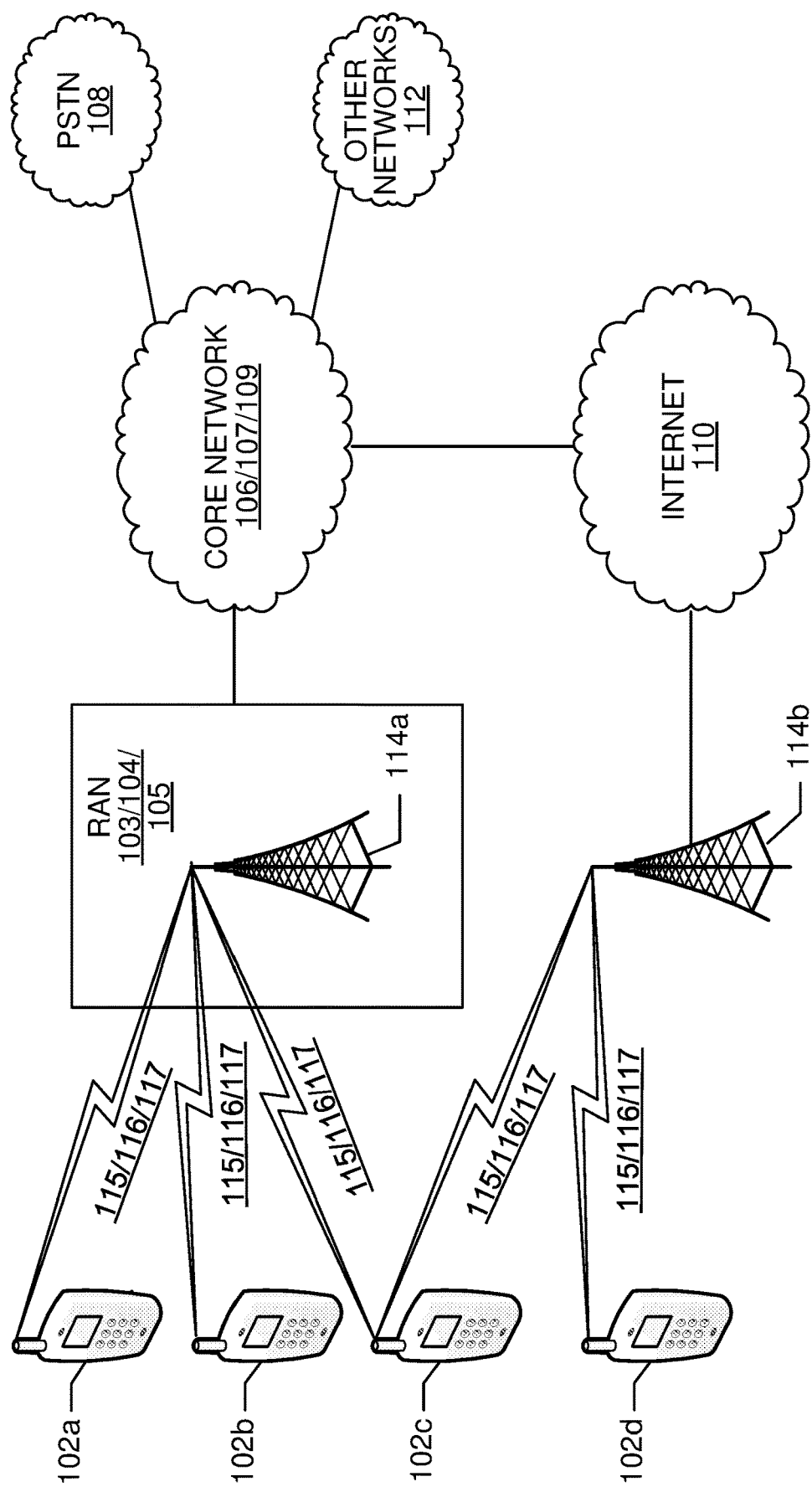
FIG. 1A depicts an example communications system in which one or more disclosed embodiments may be implemented.

The systems and methods disclosed herein may be used with the wireless communication systems described with respect to FIGS. 1A-1F. As an initial matter, these wireless systems will be described. FIG. 1A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include wireless transmit/receive unit (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E UTRA), which may establish the air interface 115/116/117 using Long Term Evolution (LTE) and/or LTE Advanced (LTE A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS 2000), Interim Standard 95 (IS 95), Interim Standard 856 (IS 856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, and the like) to establish a picocell or femtocell. As shown in FIG. 1A, the base station 114*b* may have a direct connection to the Internet 110. Thus, the base station 114*b* may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102*a*, 102*b*, 102*c*, 102*d*. As examples, the core network 106/107/109 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
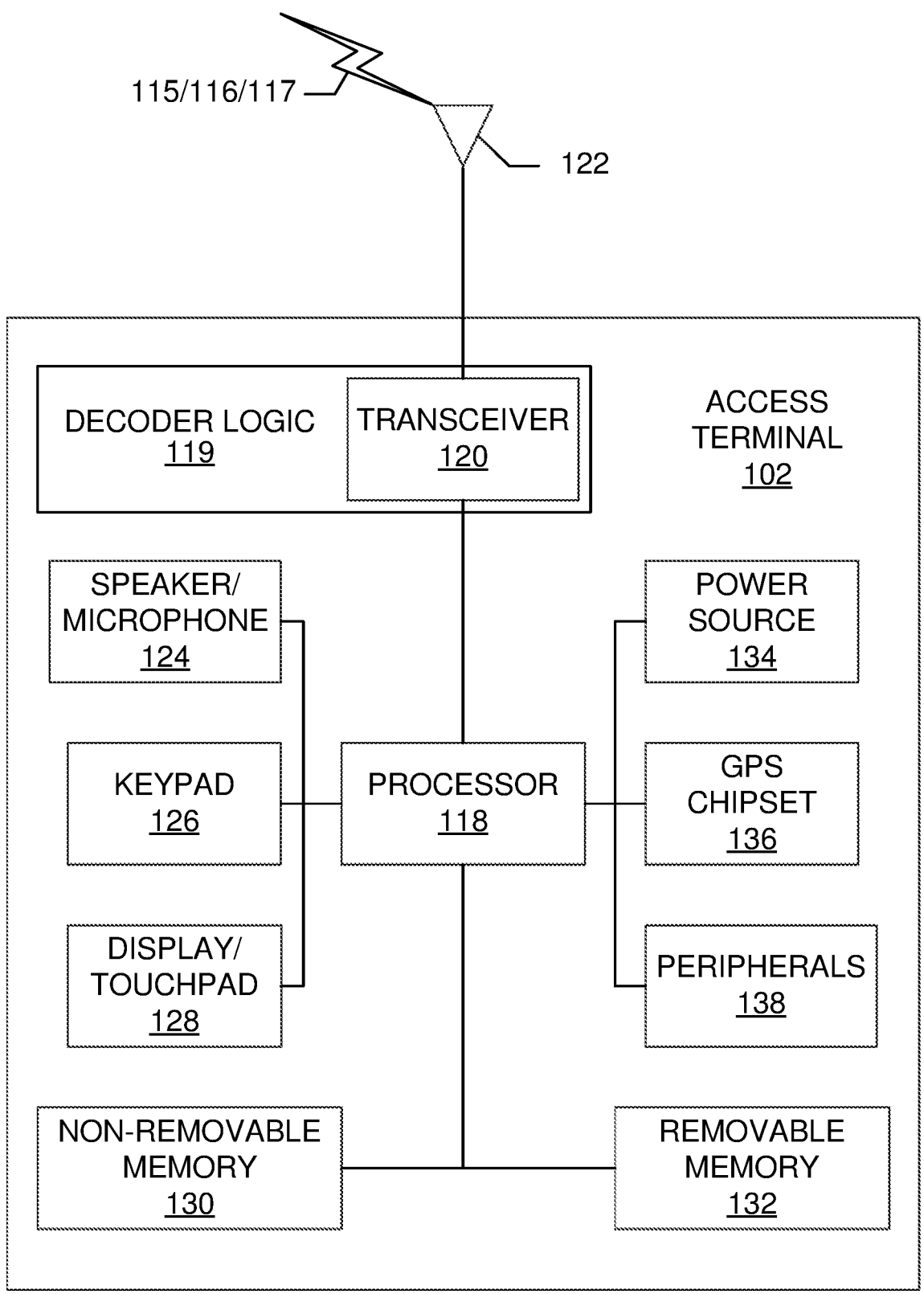
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
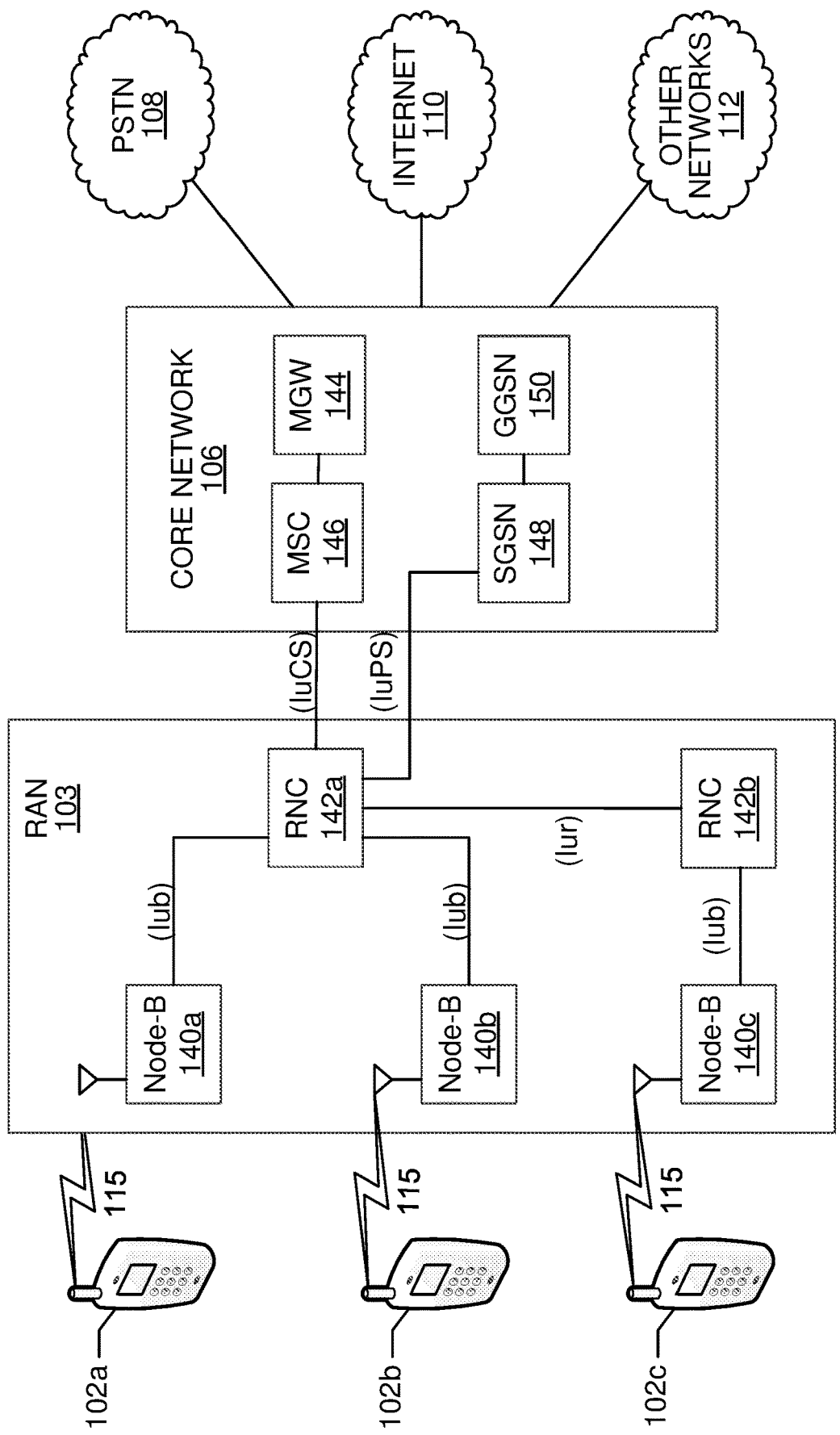
FIG. 1C depicts an example radio access network (RAN) and an example core network that may be used within the communications system of FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 1D:
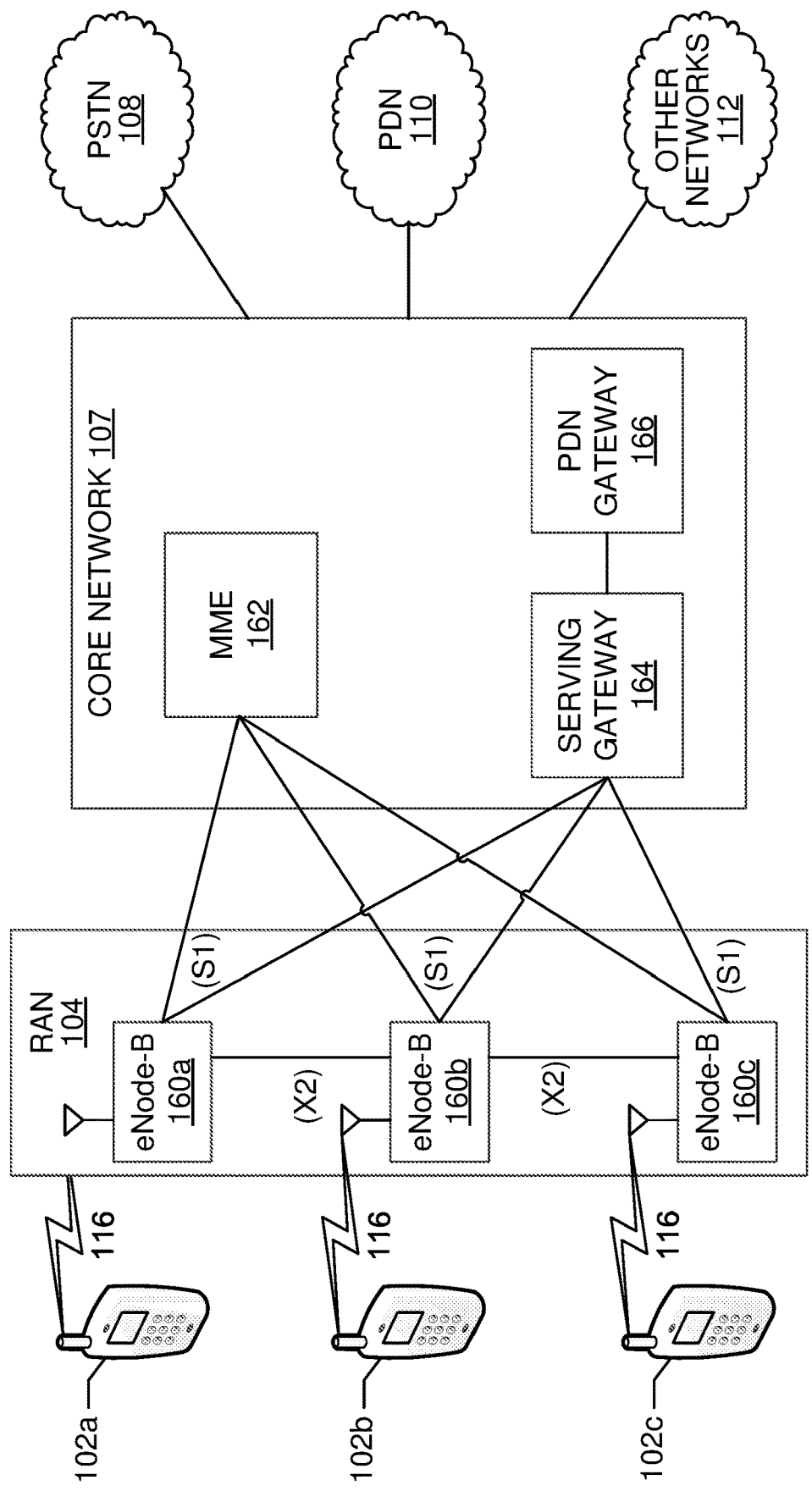
FIG. 1D depicts a second example RAN and a second example core network that may be used within the communications system of FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 1D, the eNode Bs 160a, 160b, 160c may communicate with one another over an X2 interface.

The core network 107 shown in FIG. 1D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 1E:
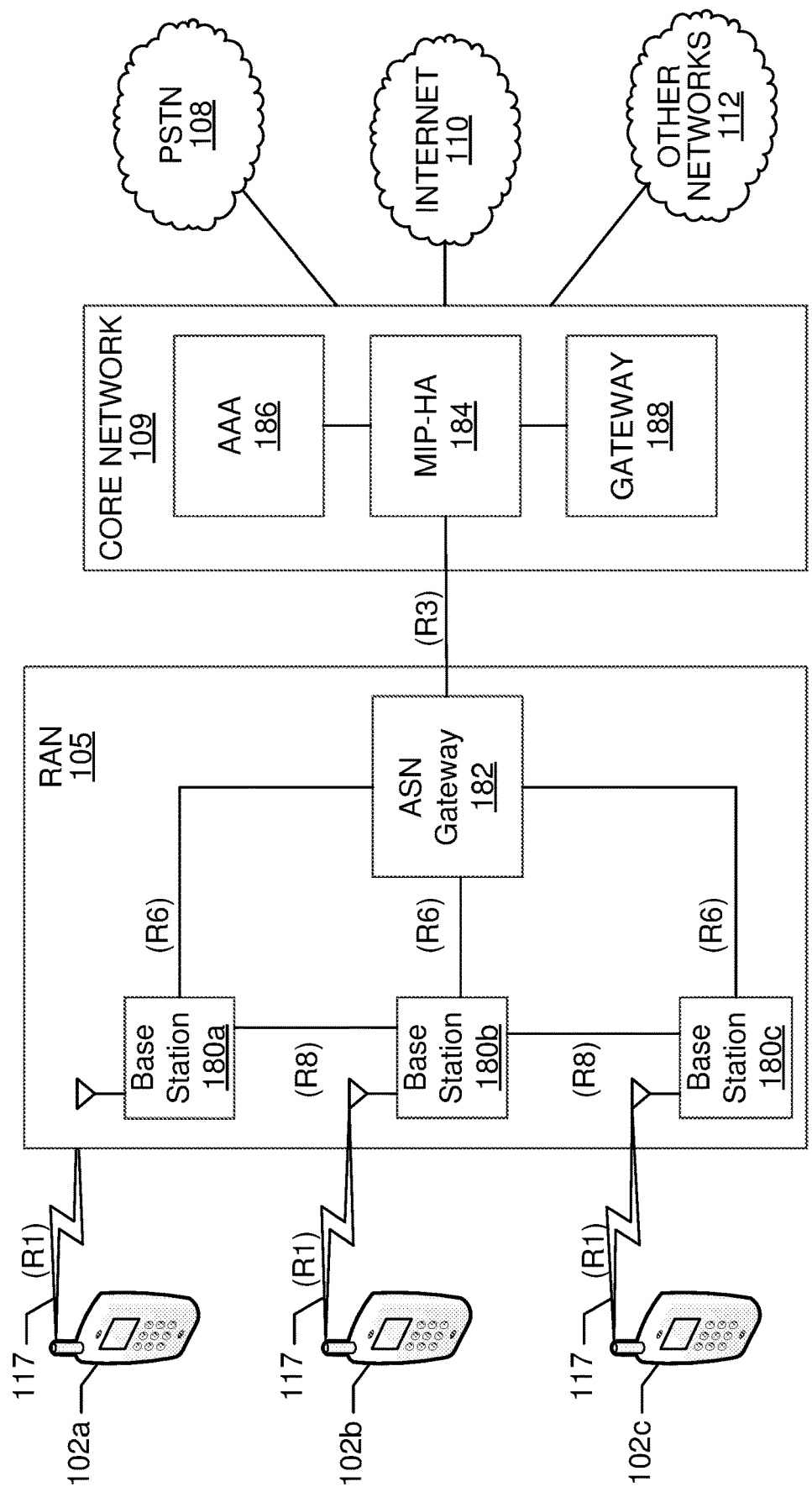
FIG. 1E depicts a third example RAN and a third example core network that may be used within the communications system of FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MW-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 1F:
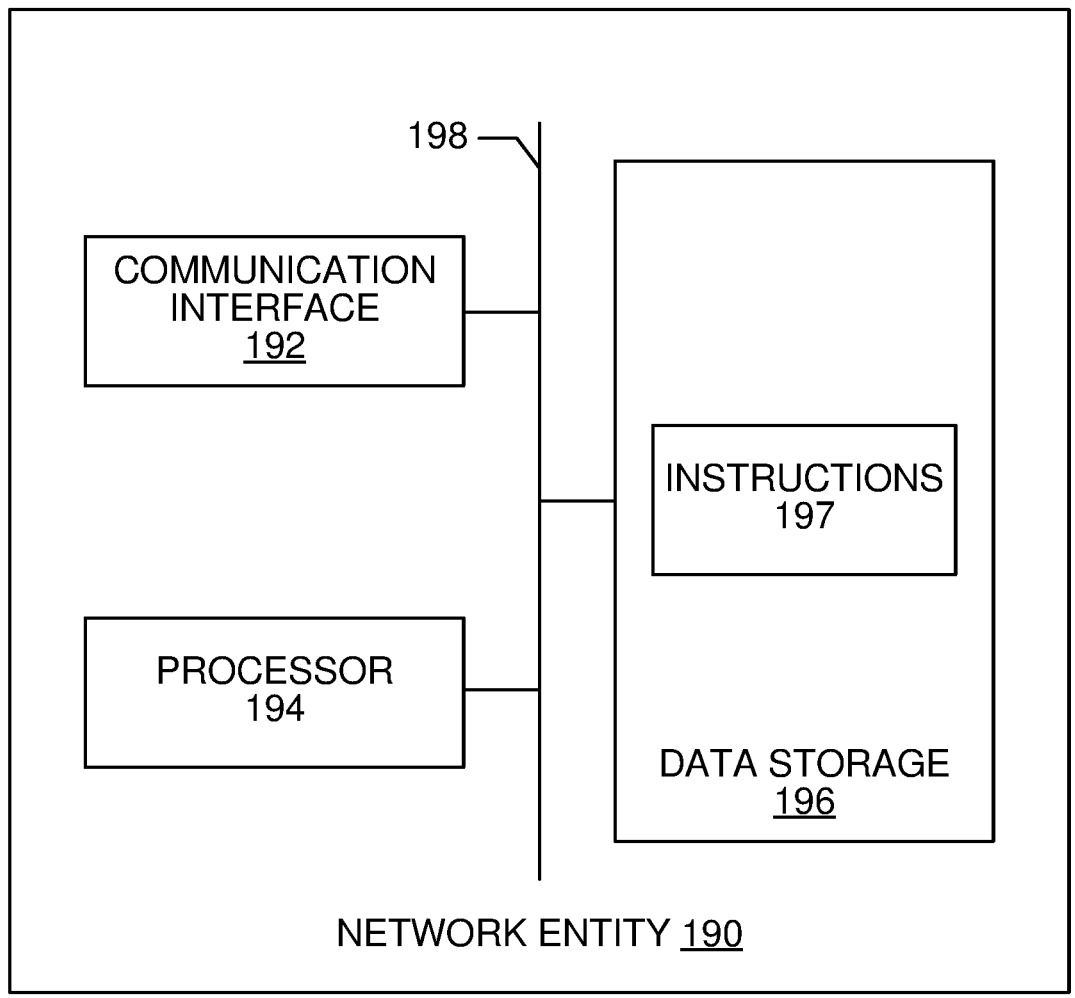
FIG. 1F depicts an example network entity that may be used within the communication system of FIG. 1A.

FIG. 1F depicts an example network entity 190 that may be used within the communication system 100 of FIG. 1A. As depicted in FIG. 1F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi Fi communications, and the like). Thus, communication interface 192 may include the appropriate equipment and circuitry (perhaps including multiple transceivers) for serving multiple mobile stations, WTRUs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 1F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 1F. In some embodiments, one or more of such functions are carried out by a set of multiple network entities in combination, where each network entity has a structure similar to that of network entity 190 of FIG. 1F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node B 140a, Node B 140b, Node B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP HA 184, AAA 186, and gateway 188. And certainly other network entities and/or combinations of network entities could be used in various embodiments for carrying out the network-entity functions described herein, as the foregoing list is provided by way of example and not by way of limitation.

Codebook Structure for Single-Panel Antenna Configuration.

In some scenarios, a codebook structure with $W_P = W_1 W_2$ for a single panel antenna configuration may be used, wherein $W_P$ may be a panel-specific precoder; $W_1$ and $W_2$ are component precoders. In some cases, $$W_1 = \begin{pmatrix} X_1 \otimes X_2 & 0 \\ 0 & X_1 \otimes X_2 \end{pmatrix},$$

where $X_1$ is a $N_1 \times L_1$ matrix with $L_1$ column vectors being an $O_1$ oversampled DFT vector of length $N_1$:

$$v_l = \begin{bmatrix} 1 & e^{\frac{j2\pi l}{N_1 O_1}} & \cdots & e^{\frac{j2\pi(N_1-1)l}{N_1 O_1}} \end{bmatrix}^T,$$

and $X_2$ is a $N_2 \times L_2$ matrix with $L_2$ column vectors being an $O_2$ oversampled DFT vector of length $N_2$:

$$v_l = \begin{bmatrix} 1 & e^{\frac{j2\pi l}{N_2 O_2}} & \cdots & e^{\frac{j2\pi(N_2-1)l}{N_2 O_2}} \end{bmatrix}^T.$$

$N_1$ and $N_2$ are the numbers of antenna ports per pol in the first and second dimension (e.g., vertical and horizontal dimension). In some cases, $$W_2 = \begin{bmatrix} s_1 \\ \alpha s_2 \end{bmatrix},$$

where $s_1$ and $s_2$ may be a column selection vector and $\alpha$ may be a co-phasing element, with, for example, $$s_1 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \cdots, \begin{bmatrix} 0 \\ 0 \\ \vdots \\ 1 \end{bmatrix} \right\} \text{ and } s_2 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \cdots, \begin{bmatrix} 0 \\ 0 \\ \vdots \\ 1 \end{bmatrix} \right\}.$$

Massive Antenna Model.

Figure 2:
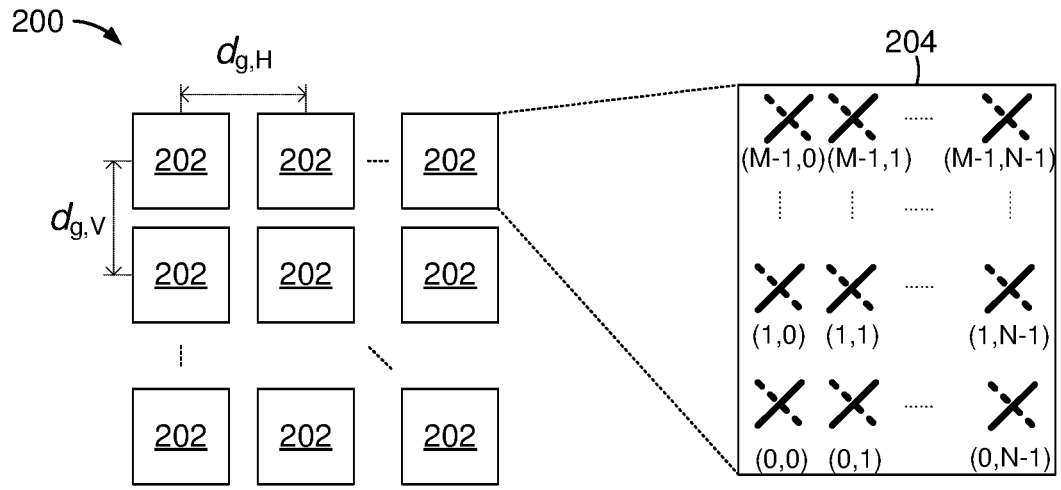
FIG. 2 is a schematic illustration of an antenna model for a transmit-receive point (TRP) and a wireless transmit/receive unit (WTRU).

FIG. 2 depicts a massive antenna model 200 that includes multiple antenna panels 202, which may be configured as Mg antenna panels per vertical dimension and Ng antenna panels per horizontal dimension. Each antenna panel 202 may be configured with N columns and M rows of antenna elements, or radiation elements, with or without polarization, as illustrated at 204 in FIG. 2. The timing and phase may or may not be calibrated across panels, although multiple panels may be equipped in the same eNB.

The baseline massive antenna configuration may be different according to the operating frequency band as listed in Table 1.

TABLE 1

Baseline massive antenna configuration
for dense urban and urban macro.

| At 4 GHz | At 30 GHz | At 70 GHz |
|---|---|---|
| Dense urban and urban macro: (M, N, P, Mg, Ng) = (8, 8, 2, 1, 1), (dV, dH) = (0.8, 0.5)λ | Dense urban and urban macro: (M, N, P, Mg, Ng) = (4, 8, 2, 2, 2), ($d_V$, $d_H$) = (0.5, 0.5)λ ($d_{g,\ V}$, $d_{g,\ H}$) = (2.0, 4.0)λ | Dense urban: Baseline: (M, N, P, Mg, Ng) = (8, 16, 2, 2, 2), ($d_V$, $d_H$) = (0.5, 0.5)λ, ($d_{g,\ V}$, $d_{g,\ H}$) = (4.0, 8.0)λ |
| A single panel 64 elements per Pol. Total 128 elements | 4 panels 32 elements per Pol. Total 256 elements | 4 panels 128 elements per Pol. Total 1024 elements |

Multiple antenna techniques have been designed and developed based on a single panel based antenna configuration. For example, MIMO transmission schemes (e.g., SU-MIMO, MU-MIMO, transmit diversity, open-loop MIMO, and closed-loop MIMO) and its associated CSI feedback have been designed based on the single panel based antenna model.

Since massive antenna models include multiple panels, and timing and phase may not be synchronized across panels, the multiple antenna techniques may benefit from improvement based on massive antenna models using multiple panels.

Overview of Exemplary Embodiments.

A multi-component precoder structure may be used to design multi-antenna techniques for a massive antenna configuration. For example, a precoder may be used for a massive antenna configuration which may use one or more panels. A precoder which is designed, used, and/or reported for a massive antenna configuration with one or more panels may be referred to as a composite precoder (e.g., $W_c$). A component precoder which is designed, used, and/or reported for a certain panel within one or more panels for massive antenna configuration may be referred to as a panel-specific precoder (e.g., $W_p$).

Figure 3:
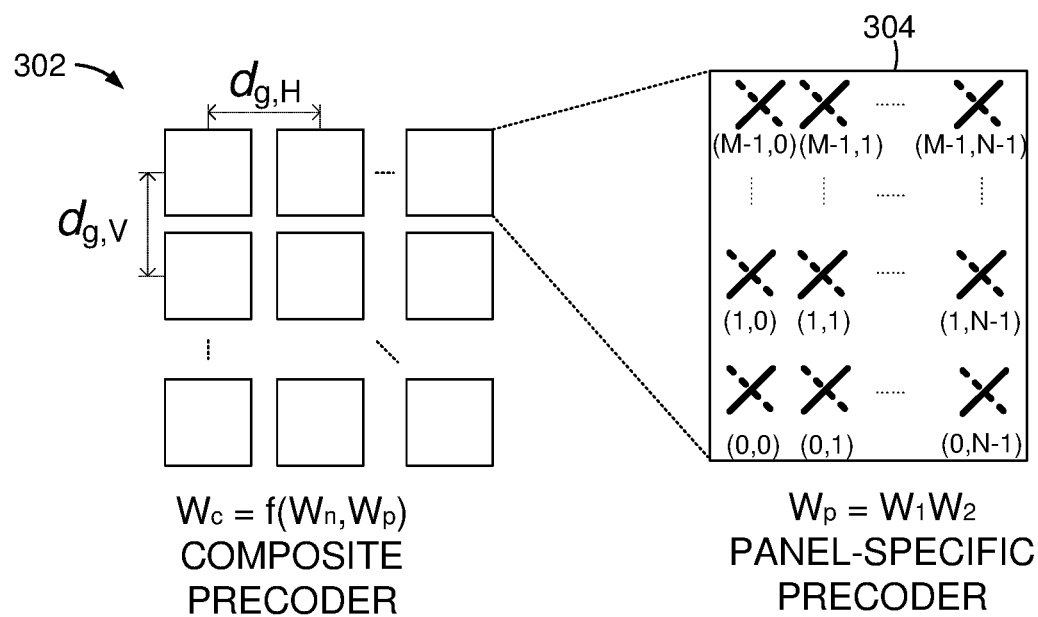
FIG. 3 is a schematic illustration of a composite precoder ($W_c$) and panel-specific precoder ($W_p$) according to an embodiment.

FIG. 3 depicts an example composite precoder 302 and panel-specific precoder $W_p$ 304 used for a massive antenna configuration.

The composite precoder 302 may be determined, generated, or constructed as a function of one or more panel-specific precoders and an extension matrix ($W_n$), wherein the term extension matrix may be interchangeably used with panel selection vector/matrix, panel co-phasing vector/matrix, and panel selection precoder, or panel co-phasing precoder, without departing from the scope of the present disclosure.

The panel-specific precoder $W_p$ 304 may have component precoders $W_1$ and $W_2$. In some embodiments, $W_1$ may be a component precoder for a wideband beam group reporting. For example, a group of beams may be reported in a wideband manner, wherein the group of beams may be based on oversampled DFT beams for vertical and horizontal antenna ports. In some embodiments, $W_2$ may be a component precoder for a subband beam selection and co-phasing of polarized antenna ports.

Determination of Composite Precoder Function

A function f ($W_n$, $W_p$) to determine or construct a composite precoder may be configured, used, determined, predetermined, or selected based on at least one of following.

In some embodiments, f($W_n$, $W_p$) is determined based on the transmission scheme used, configured, or determined. For example, a first function (e.g., panel-selection) may be used for a first transmission scheme (e.g., transmit diversity) and a second function (e.g., panel co-phasing) may be used for a second transmission scheme (e.g., beamforming).

In some embodiments, f($W_n$, $W_p$) is determined based on the MIMO mode of operation used, configured, or determined. For example, a first function (e.g., panel-selection) may be used for a first MIMO operation mode (e.g., MU-MIMO operation mode) and a second function (e.g., panel co-phasing) may be used for a second MIMO operation mode (e.g., SU-MIMO operation mode). The MIMO operation mode may include at least one of but not limited to MU-MIMO, SU-MIMO, Open-loop MIMO, Closed-loop MIMO, and CoMP.

In some embodiments, f($W_n$, $W_p$) is determined based on the operating frequency band. For example, a first function may be used for a first operating frequency band (e.g., below 6 GHz) and a second function may be used for a second operating frequency band (e.g., above 6 GHz).

In some embodiments, f($W_n$, $W_p$) is determined based on the number of panels configured, used, or determined in a massive antenna configuration. The function may be determined based on Mg and Ng parameters.

Panel Configuration for Reference Signals

In exemplary embodiments, a panel may be configured, determined, defined, or used for transmission of a reference signal. For example, a first panel may be configured as a first CSI-RS configuration and a second panel may be configured as a second CSI-RS configuration.

The CSI-RS configuration may include at least one of following: (i) One or more of CSI-RS reuse patterns, where a CSI-RS reuse pattern may be time/frequency locations of CSI-RS ports within a certain time window (e.g., subframe or TTI); (ii) Transmission power of the CSI-RS; (iii) Non-zero-power or zero power; and/or (iv) Duty cycle and/or timing offset of one or more of CSI-RS reuse patterns.

A CSI-RS configuration associated with a panel may be defined as Class-A CSI-RS (e.g., non-precoded CSI-RS) or Class-B CSI-RS (e.g., beamformed CSI-RS). Class-A or Class-B CSI-RS may be associated with a 2D antenna array within a panel.

A panel may be configured, determined, defined, or used as a cell (or sector). For example, each panel may be associated with a physical or virtual cell-ID. The associated cell-ID may be used to scramble an associated reference signal (e.g., CSI-RS).

Reference Signal Configuration.

In exemplary embodiments, an antenna port may be defined or configured as a reference signal, wherein a reference signal configuration may include one or more following: (i) A time/frequency resource element pattern (or reuse pattern); (ii) A bit sequence which may be modulated to modulated symbol sequence; (iii) A reference signal power (or relative reference signal power); (iv) Periodicity (e.g., periodic or aperiodic); and/or (v) Spreading code index if multiple antenna ports are multiplexed in code domain.

The antenna elements in an antenna configuration may be virtualized into one or more antenna ports, and a WTRU may measure, receive, or estimate channel characteristics of the one or more antenna ports. These measurements may include parameters described herein as QCL parameters. The number of antenna ports may be equal to or smaller than the number of antenna elements.

In some embodiments, two types of CSI feedback may be used, wherein the first type of CSI feedback may be associated with a set of antenna ports and the second type of CSI feedback may be associated with one or more sets of antenna ports. Hereafter, the phrase "set of antenna ports" may be interchangeable with the phrases "CSI-RS", and "CSI-RS configuration". A first type of CSI feedback may be associated with a CSI-RS (or CSI-RS configuration). The first type of CSI feedback may include but is not limited to precoding matrix indicators (PMI), rank indicator (RI), and/or channel quality indicator (CQI) which may be calculated, determined, or estimated based on a single CSI-RS. A second type of CSI feedback may be associated with multiple CSI-RSs (or CSI-RS configurations). The second type of CSI feedback may include but not limited to CSI-RS index (CRI), PMI, RI, and/or CSI which may be calculated, determined, or estimated based on multiple CSI-RS.

Figure 4:
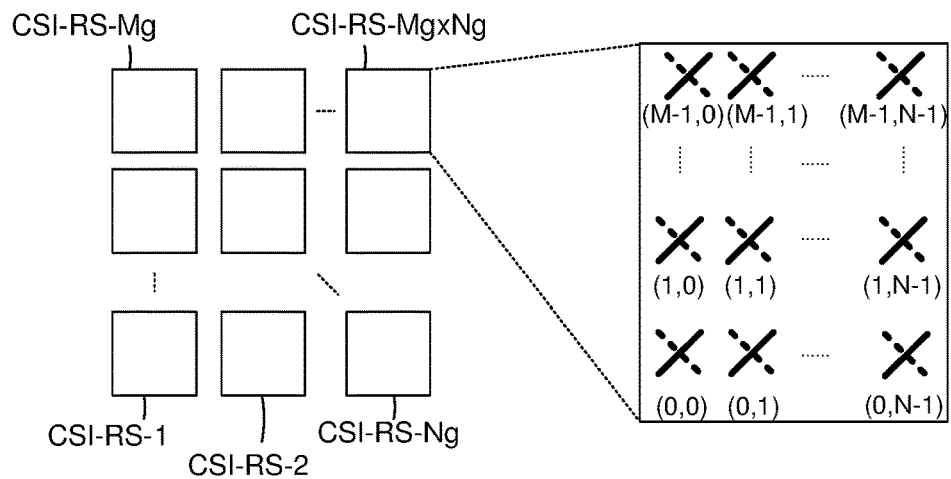
FIG. 4 is a schematic illustration of an example of panel-specific CSI-RS configuration.

In an exemplary embodiment, a CSI-RS may be configured for each panel. For example, one or more of CSI-RSs may be configured for a transmission point (TRP) with one or more panels, wherein a CSI-RS may be associated with a panel in the TRP. The number of CSI-RS configurations may be the same as the number of panels in the TRP. A panel and a CSI-RS configuration may be interchangeably used. The number of antenna ports may be the same for all CSI-RS configurations which may be associated with a TRP. If Mg×Ng panels are used in a TRP, Mg×Ng CSI-RS configurations may be used as shown in FIG. 4.

In some embodiments, a WTRU is configured with Na CSI-RS configurations and the Na CSI-RS configurations may be based on at least one of following.

The associated panel location may be indicated. For example, a two-dimensional position of the panel associated with the CSI-RS may be indicated.

In the case of Mg=2 and Ng=2, four CSI-RS configurations (i.e., Na=4, Na=Mg×Ng) may be used and the associated panel position may be indicated as $(I_v, I_h)$, wherein $I_v$ may be referred to as the position in vertical dimension and $I_h$ may be referred to as the position in horizontal dimension. Therefore, the panel position may be one of (0,0), (0,1), (1,0), and (1,1) in the case of Mg=2 and Ng=2.

A WTRU may report a second type of CSI feedback (e.g., CSI feedback associated with multiple CSI-RS). For example, a precoding matrix index (PMI) may be determined based on the set of CSI-RS configurations with its associated position.

A codebook structure (or a codebook) may be determined based on the associated panel positions. For example, a first codebook may be used if Mg=1 and Ng=4 and a second codebook may be used if Mg=2 and Ng=2. Therefore, a codebook for PMI reporting may be determined based on Mg and Ng configuration rather than Na configuration.

The number of antenna ports may be the same for Na CSI-RS configurations. For example, Np antenna ports may be used for Na CSI-RS configurations.

A WTRU may report one or more CSIs which may be related to $W_n$ and $W_p$, wherein the one or more CSIs may be determined, estimated, or calculated based on Na CSI-RS configurations.

In one embodiment, a non-precoded CSI-RS may be transmitted from the antennas of different panels, where antennas on different panels may be virtualized to a common CSI-RS.

In another embodiment, a non-precoded CSI-RS may be transmitted from the antennas of one panel, for example when the panels may not satisfy the condition of being co-located, e.g. where the distance between the panels is above a threshold. The non-precoded CSI-RSs from separate panels may be multiplexed in time and/or frequency and/or code domains. The WTRU may measure the non-precoded CSI-RSs and feedback the corresponding CSI.

In another embodiment, a CSI-RS may be used for one or more panels in a TRP. For example, a CSI-RS with Mg×Ng× Np antenna ports may be used for a TRP with one or more panels. One or more of following may apply: (i) A subset of antenna ports may be associated with a panel; and/or (ii) A WTRU may be provided an indication of the association between a subset of antenna ports and panel (and/or panel positions).

In an exemplary embodiment, one or more quasi-collocation (QCL) types may be defined, determined, configured, or used for the one or more CSI-RS configurations, wherein QCL may indicate whether two or more of CSI-RS configurations (or CSI-RSs) are quasi-collocated (or assumed to be the same) in terms of QCL parameters (receive signal characteristics) that may include at least one of delay spread, Doppler spread, frequency shift, average received power, received timing, and beam index (or spatial Rx parameter). A QCL type may be used to indicate whether full or partial QCL parameters are QCL-ed or non-QCL-ed, wherein the phrase "QCL-ed" may be used to refer to CSI-RSs that have the same received signal characteristics for some of the QCL parameters and non-QCL-ed may be used to refer to CSI-RSs that are considered to have different received signal characteristics with respect to the QCL parameters. Thus, a set of RS configurations classified as having a shared QCL type can be used to indicate to a WTRU what reference signals from respective RS configurations may be measured in order to obtain the full set of QCL parameters needed by the WTRU to process a given data transmission. More specifically, a set of RS configurations that are designated as a QCL type enables the WTRU to measure the specified characteristics (those specified for the given QCL type) from the entire set of RS configurations when determining the channel characteristics (QCL parameters). The WTRU is then able to obtain more reliable measurements for the relevant subset of QCL parameters.

A first QCL type (e.g., Type-1) in one embodiment may indicate that one or more of quasi-collocated CSI-RS configurations may be assumed or considered to have received signal characteristics (or conditions) that are the same in terms of a predetermined set of QCL parameters. The predetermined set may include some or all of: delay spread, Doppler spread, frequency shift, average received power, and received timing. For example, one or more of Type-1 quasi-collocated CSI-RS configurations may have the same (or similar) signal characteristics in terms of delay spread, Doppler spread, frequency shift, average received power, and received timing. In such embodiments, a higher level (RRC) QCL-type message may be provided to the WTRU to list the RS configurations that are grouped together in the given QCL type.

A second QCL type (e.g., Type-2) may indicate that a subset of received signal characteristics from one or more of quasi-collocated CSI-RS configurations are the same. The signal characteristics in the subset may be predetermined, or may be separately signalled by the system. For example, the received signal characteristics from one or more of Type-2 quasi-collocated CSI-RS configurations may have the same (or similar) signal characteristics in terms of delay spread, Doppler spread, and received power, while frequency shift and received timing may be assumed to be different. Therefore, in one embodiment, a WTRU that has been allocated a specific receive resource corresponding to a first RS configuration may determine whether any other RS configurations have been grouped with the first RS configuration in a QCL type message/indication (signalled, e.g., by RSS), and the WTRU may then responsively determine, according to the QCL type (type 1, type 2, etc.) which QCL parameters may be measured from RS configurations other than the specifically assigned receive resource. By processing the QCL type information, which groups sets of RS configurations according to their common QCL parameters, the WTRU is able to make signal characteristic measurements on reference signals from RS configurations other than its assigned data RS configuration, and those measurements will still be beneficial to the WTRU when processing received signals on its assigned RS configuration.

A third QCL type (e.g., Type-3) may indicate that the received signal characteristics from one or more Type-3 quasi-collocated CSI-RS configurations are different. Thus, in one embodiment, the WTRU may determine that the RS configuration being used for data transmission to the WTRU has no supplemental RS configurations that may be used to augment its signal characteristics measurements.

A WTRU may be provided with an indication of the QCL type for one or more CSI-RS configurations (e.g., one or more sets of RS configurations), wherein the QCL type may indicate that which QCL parameters are QCL-ed (or non-QCL-ed) for the one or more CSI-RS configurations. A first QCL type may be used to indicate which QCL parameters are QCL-ed between CSI-RS configurations and a second QCL type may be used to indicate which QCL parameters are non-QCL-ed between CSI-RS configuration. Another QCL type may be used to indicate which QCL parameters are non-QCL-ed and the rest of QCL parameters may be considered as QCL-ed.

CSI-RS configurations may be interchangeably used with multiple layer transmissions, multiple codeblock transmissions, wherein a layer may be a spatial layer of multi-layer MIMO transmission and a codeblock may be a coded bit sequence associated with a transport block. QCL type may be indicated for one or more layers transmitted, wherein an associated CSI-RS configuration for each layer may be indicated (e.g., in a DCI). QCL type may be indicated for one or more codeblocks transmitted, wherein an associated CSI-RS configuration for each codeblock may be indicated (e.g., in a DCI).

The designation of "CSI-RS" may be interchangeably used with the term "reference signal", a "measurement reference signal", a "demodulation reference signal", and a "cell-specific reference signal" without departing from the scope of the present disclosure.

Figure 5:
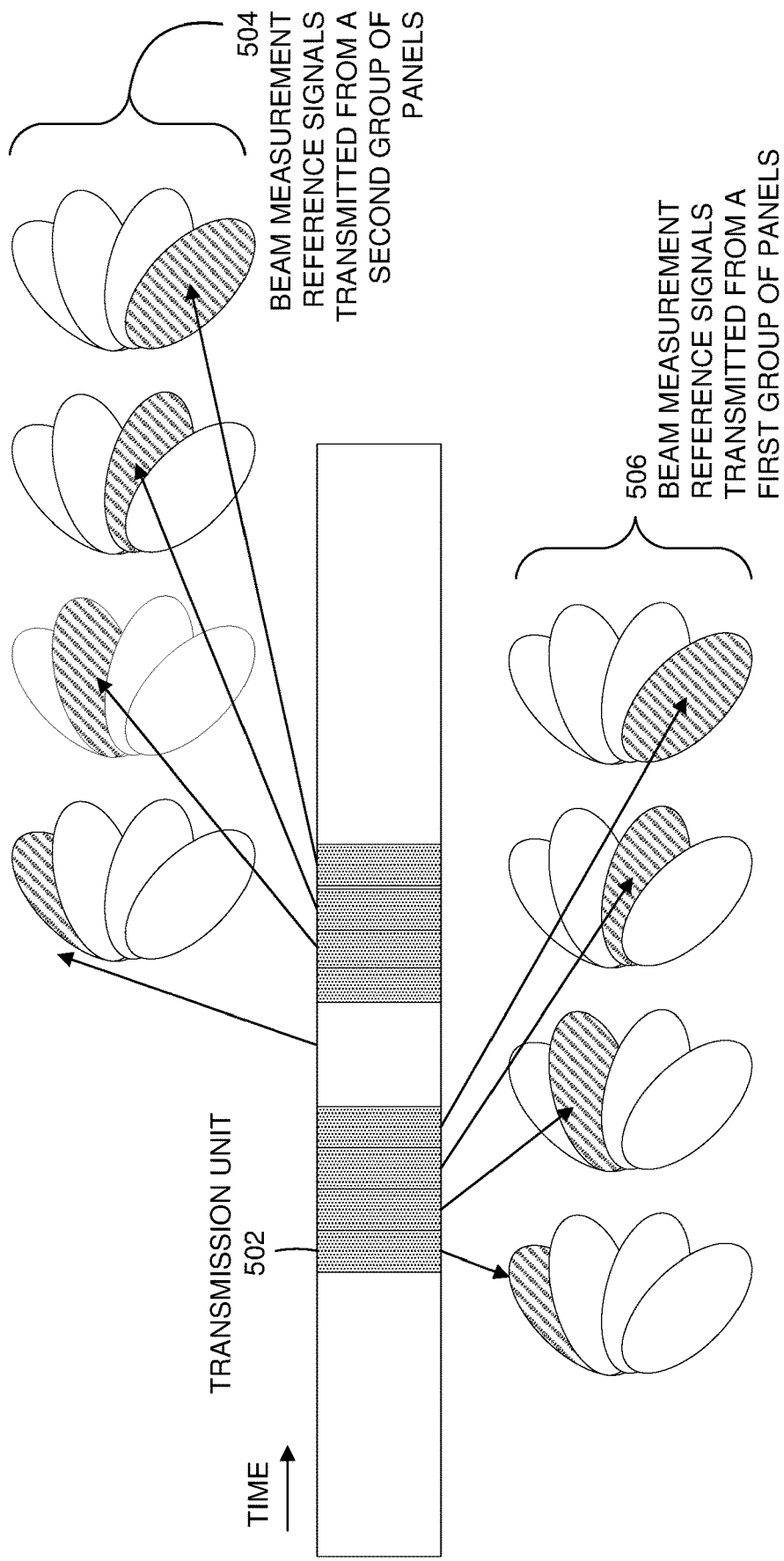
FIG. 5 is a schematic illustration of an example of beam measurement reference signal transmission.

In some embodiments, beam measurement reference signals may be transmitted from a group of antennas where the reference signal transmissions may be multiplexed in time and beamformed in different directions. The WTRU may measure all the reference signals and may provide feedback indicating the preferred direction, and/or the beamforming matrix that was used to create the signal in the preferred direction, and/or an index to this matrix. When multiple panels are employed, the beam measurement reference signals transmitted from different panels may be multiplexed in time. An example is shown in FIG. 5, where beam measurement reference signals 504 and 506 from two groups of panels are transmitted and these transmissions are multiplexed in time. A group may include one or more panels. In the embodiment of FIG. 5, a transmission unit 502 may be a waveform symbol, such as an OFDM or DFT-s-OFDM symbol, or may be a group of waveform symbols. In each transmission unit 502, a beam is generated and the generated beam is shown with a patterned filling. In another embodiment, beams from multiple panels may be transmitted simultaneously during the same transmission unit, these beams may be repeated over a multiple of transmission units, and each beam during a transmission unit may be scaled with a coefficient. These coefficients may be chosen such that they form an orthogonal cover. As an example, one beam from a first panel may be transmitted over two OFDM symbols and multiplied by [1 1] (where nth coefficient multiplies the beam on the nth OFDM symbol); while another beam from a second panel may be transmitted over the same two OFDM symbols and multiplied by [1−1].

Transmission Schemes with Multi-Component Precoder.

One or more multiple antenna transmission schemes may be defined, configured, used, or determined based on the function (or precoding structure) used for the composite precoder ($W_c$), extension matrix ($W_n$), and the panel-specific precoder ($W_p$).

(Semi) Open-Loop Transmission Scheme

In an exemplary embodiment, the composite precoder $W_c$ may be defined, determined, or used as $W_c = W_n \otimes W_p$, wherein $\otimes$ may be a Kronencker product, $W_n$ may be a Na×1 vector, and $W_p$ may be a Np×R precoding vector/matrix which may be associated with a panel (e.g., a CSI-RS).

$W_n$ may be used, defined, or configured as a random co-phasing vector/matrix. For example, one or more co-phasing vectors/matrices may be used, configured, or predetermined and one of the co-phasing vectors/matrices may be determined for $W_n$ based on one or more resource parameters.

In an example, the composite precoder $W_c$ may be set as $W_c(k,i) = W_n(k) \otimes W_p(i)$, wherein $W_n(k)$ and $W_p(i)$ may be component precoders which may be determined based on indices k and i. One or more of following may apply.

$W_n(k)$ may be determined as a function of the index k. k may be a resource index which may include at least one of subcarrier, a set of subcarriers, PRB, PRB-pair, subband, OFDM symbol, and subframe. A predefined or a configured set of vectors/matrices may be used for $W_n$, wherein the set of vectors/matrices for $W_n$ may be referred to as a codebook. A codebook may have Nc vectors/matrices. A vector/matrix may be interchangeably used with a codeword in a codebook. A modulo operation based on k and Nc may be used to determine a codeword. A codeword of one or more codewords in a codebook may be cyclically selected based on the resource index k, which may be referred to as codeword cycling or precoder cycling. A random sequence may be used to determine a codeword in a codebook based on the index k. A codeword of one or more codewords in a codebook may be randomly selected based on the random sequence, which may be referred to as random precoding.

The index k may be an index which may be signaled, determined, or configured via higher layer signalling. A WTRU may be semi-statically configured with a $W_n(k)$. The $W_n(k)$ may be a WTRU-specific antenna virtualization matrix. A WTRU may measure, estimate, and/or report one or more CQIs based on determined or configured $W_n(k)$.

$W_n(k)$ may be a phase shift vector/matrix which may be determined as a function of k $$W_c(k, i) = W_n(k) \otimes W_p(i) = \begin{bmatrix} 1 \\ e^{j\theta_1 k} \\ e^{j\theta_2 k} \\ e^{j\theta_3 k} \end{bmatrix} \otimes W_p(i),$$

wherein $\theta_n = n \times \theta$

The phase shift vector/matrix may be determined by the receiver, for example a WTRU, based on transmitted reference signals and fed back to the transmitter, for example the eNB. Na CSI-RSs may be configured where each CSI-RS configuration may use CSI-RSs transmitted from the antennas on a group of panels where a group may consist of one or more panels. The CSI-RSs transmitted from different groups of panels may be multiplexed in time and/or frequency domains; they also may be multiplexed by applying orthogonal cover codes in time and/or frequency. The phase shift matrix may be determined by the receiver by measuring the CSI-RSs from different groups of panels. The phase shift matrix may be chosen from a set of pre-determined or configured matrices, e.g. a codebook. The WTRU may determine a phase shift matrix for a set of CSI-RSs where the set may be configured and dynamically signaled by the eNB or another controller. The determined phase shift matrix may be fed back to the controller. In another embodiment, the controller may signal to the WTRU whether a phase shift matrix is required. The set(s) of CSI-RSs to which the phase shifts would apply may be configured by the controller.

In some embodiments, $W_p(i)$ may be determined as a function of an index i. The index i may be a resource index which may include at least one of subcarrier, a set of subcarriers, PRB, PRB-pair, subband, OFDM symbol, and subframe. A codebook may be used for $W_p$ and the index i may determine a codeword in the codebook for a resource associated with the index i.

In some embodiments, $W_p(i)$ may be constructed, determined, generated, or used by one or more component precoders.

In some embodiments, $W_p(i) = W_p^v(i) \otimes W_p^h(i)$ may be used, wherein $W_p^v(i)$ may be a component precoder for vertical antenna ports in a panel (or a CSI-RS) and $W_p^h(i)$ may be a component precoder for horizontal antenna ports in a panel (or a CSI-RS). The composite precoder may be generated or determined based on $W_c(k,i) = W_n(k) \otimes (W_p^v(i) \otimes W_p^h(i))$. The index k and i may be a resource index and they may have a different resource granularity (or resource type). For example, the resource index k may be a subframe number (or a radio frame number) and the resource index i may be a PRB (or PRB-pair) number. The index k may be indicated while the index i may be determined based on the resource used, or vice-versa. For example, the index k may be signaled, indicated, or configured by eNB and the index i may be the resource index for which a WTRU may report a CSI.

In some embodiments, $W_p(i) = W_p^1(i_1) W_p^2(i_2)$ may be used, wherein $W_p^1(i_1)$ may be a precoder which may be determined in a long-term and wideband manner and $W_p^2(i_2)$ may be a precoder which may be determined in a short-term and subband manner. The composite precoder may be generated or determined based on $W_c(k, i) = W_n(k) \otimes (W_p^1(i_1) W_p^2(i_2))$. The index k may be indicated while the indices $i_1$ and $i_2$ may be determined based on the resource used, or vice-versa. The indices $i_1$ and $i_2$ may be associated with a different resource type. For example, $i_1$ may be a subframe number (or a radio frame number) and $i_2$ may be a PRB (or PRB-pair) number. In some embodiments, the index $i_1$ may be reported by a WTRU and $i_2$ may be determined based on the resource. For example, a WTRU may first determine $i_1$ and calculate/estimate one or more of CQIs for a specific time/frequency resource based on the determined $i_1$ and associated resource index $i_2$ for the time/frequency resource. The WTRU may report $i_1$ and corresponding one or more of CQIs.

In some embodiments, the composite precoder $W_c$ may be defined as $W_c(k,i) = W_n(k) W_p(i)$, wherein $W_n(k)$ may be an Nt×Np matrix and $W_p(i)$ may be an Np×R vector/matrix. The Nt may be referred to as a total number of antenna ports which may be equivalent to Mg×Ng×Np if the number of antenna ports is the same for all panels.

In some such embodiments, $W_n(k)$ may be an antenna virtualization matrix which may be configured, determined, or indicated in a WTRU-specific manner. Alternatively, $W_n(k)$ may be a cell-specific antenna virtualization matrix which may be configured or indicated via a higher layer signaling (e.g., broadcasting channel).

In other such embodiments, $W_n(k)$ may be a fixed matrix and known to WTRU and eNB. In this case, the composite precoder may be generated based on $W_c(i) = W_n W_p(i)$ In still further such embodiments, $W_n(k)$ may be a matrix which may be determined as a function of the resource index k.

In an alternative embodiment, the composite precoder $W_c$ may be defined, determined, or used as a sparse matrix $W_c = W_n \otimes W_p$ wherein $\otimes$, $W_n$ and $W_p$ are Kronencker product, Na×1 panel selection sparse vector and Np×R antenna selection sparse matrix. The $W_n$ and $W_p$ may be configured to select a similar subset of elements from every selected panel.

Figure 6:
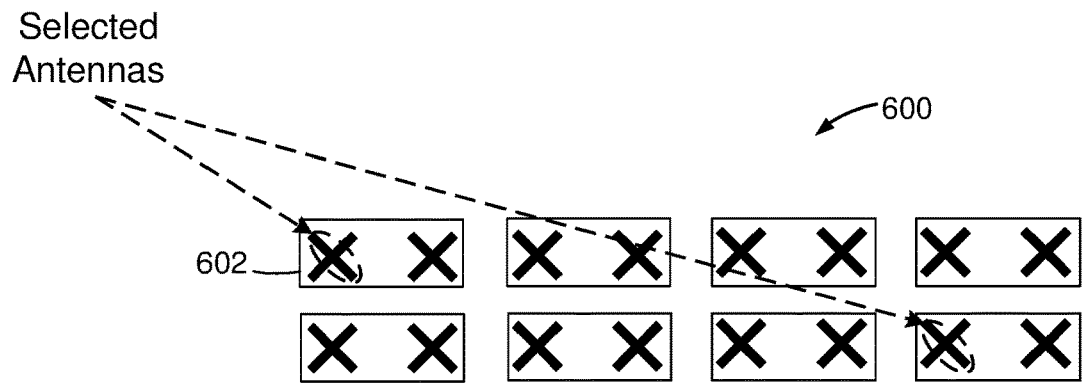
FIG. 6 is a schematic illustration of an example of antenna selection with similar choice of element per panel.

FIG. 6 shows an exemplary antenna system 600 with 8 panels 602 where there exist 4 antenna elements per panel. Assuming a rank 2 transmission and also use of similar element from each panel, the selection matrices may be set as follows:

$$W_n = \begin{bmatrix} 1 \\ 0 \\ \vdots \\ 0 \\ 1 \end{bmatrix}_{8 \times 1}, W_p = \begin{bmatrix} 1 & 0 \\ 0 & 0 \\ 0 & 0 \\ 0 & 0 \end{bmatrix}_{4 \times 2} \rightarrow W_c = W_n \otimes W_p = \begin{bmatrix} 1 & 0 \\ 0 & 0 \\ \vdots & \vdots \\ 0 & 0 \\ 1 & 0 \\ 0 & 0 \\ 0 & 0 \\ 0 & 0 \end{bmatrix}_{32 \times 2}$$

In another embodiment, to enable selection of dissimilar subset of elements from the selected panels, and also allow selection of different co-phasing per element, the composite precoder $W_c$, may be constructed as:

$$W_c = \sum_{j=1}^{N_a} W_{nj} \otimes W_{pj},$$

wherein $\otimes$, $W_{nj}$ and $W_{pj}$ are Kronencker product, Na×1 panel selection sparse vector and Np×R antenna selection sparse matrix. The $W_{nj}$ and $W_{pj}$ may be configured to select an arbitrary subset of elements per panel with possibility of an arbitrary co-phasing weight per element.

Figure 7:
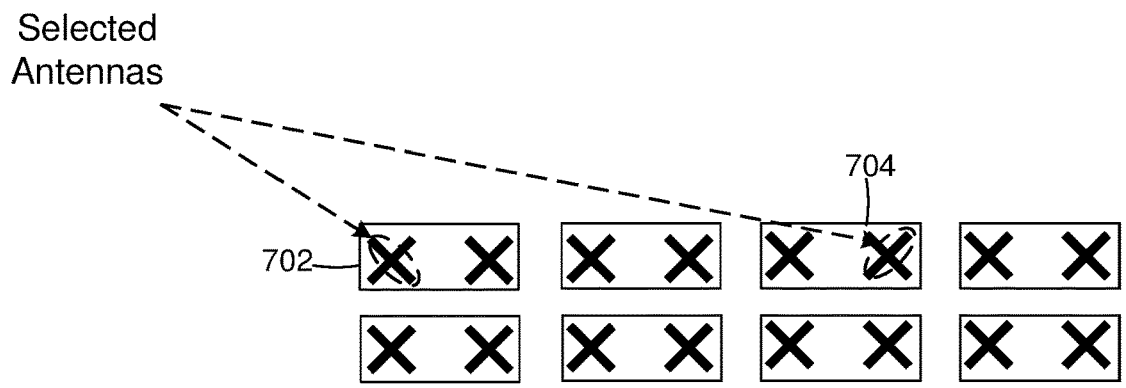
FIG. 7 is a schematic illustration of an example of antenna selection with similar choice of element per panel.

As an example, for a rank 2 transmission with use of dissimilar elements of different panels, the selection matrices for selected panels 702 and 704 in FIG. 7 may be set as follows.

$$W_{n1} = \begin{bmatrix} 1 \\ 0 \\ \vdots \\ 0 \\ 0 \end{bmatrix}_{8\times 1}, W_{p1} = \begin{bmatrix} \rho_1 & 0 \\ 0 & 0 \\ 0 & 0 \\ 0 & 0 \end{bmatrix}_{4\times 2}$$

$$W_{n2} = \begin{bmatrix} 0 \\ 0 \\ 1 \\ 0 \\ \vdots \\ 0 \end{bmatrix}_{8\times 1}, W_{p2} = \begin{bmatrix} 0 & 0 \\ 0 & 0 \\ 0 & 0 \\ 0 & \rho_2 \end{bmatrix}_{4\times 2}$$

$$\rightarrow W_c = W_n \otimes W_p = \begin{bmatrix} \rho_1 & 0 \\ 0 & 0 \\ 0 & \rho_2 \\ 0 & 0 \end{bmatrix}_{32\times 2}$$

Panel selection matrices, $(W_n, W_{nj})$ and antenna element selection matrices $(W_p, W_{pj})$ may be defined as part of cell configuration, WTRU-specific, or defined for a group of WTRU's.

In case of WTRU-specific configuration, the selection matrices may be determined based on WTRU mobility, path loss, angle of arrival and mode of the transmission.

In case of a group-based configuration, the selection matrices may be assigned based on similar considerations as WTRU-specific, but also it may be based on consideration for MU-MIMO operation. For example, WTRU pairs intended for MU-MIMO operation may be assigned to different selection groups to reduce the inter-cell interference.

In some embodiments, panel selection matrices, $(W_n, W_{nj})$ and antenna element selection matrices $(W_p, W_{pj})$ may be dynamically configured.

The selection matrices may be updated on symbol, subframe or frame basis, however they may not necessarily have the same rate of updates. In an exemplary embodiment, the panel selection matrices may be updated at a slower rate than the antenna selection matrix.

In one solution, the dynamic selection may be based on permutation of the selection matrices. Panel selection matrices, $W_n$ and $W_{nj}$ may be permuted to allow dynamic selection of panels. Similarly, antenna element selection matrices $W_p$ and $W_{pj}$ may also be permuted in conjunction with panel selection matrices or independently. In one embodiment, the permutation process is realized by operator p(W) that swaps a non-zero row with another all zero or none-zero row. For example, one potential permutation of W is $$W = \begin{bmatrix} 1 & 0 \\ 0 & 0 \\ 0 & 0 \\ 0 & 0 \end{bmatrix} \rightarrow W_{permutated} = p(W) = \begin{bmatrix} 0 & 0 \\ 0 & 0 \\ 1 & 0 \\ 0 & 0 \end{bmatrix}$$

The permutation may be cell-specific, WTRU-specific, or defined for a group of WTRU's, or performed randomly. In case of WTRU-specific configuration, the permutation may be determined based on WTRU mobility, path loss, angle of arrival and mode of the transmission. In case of a group-based permutation, the permutation process may be assigned based on similar considerations as WTRU-specific, but also it may be based on consideration for MU-MIMO operation. For example, WTRU pairs intended for MU-MIMO operation may be assigned to different selection groups to reduce the inter-cell interference.

The composite precoder may be represented by $W_c(k,i)$, wherein k and i indicate the dependencies of panel selection matrices$(W_n, W_{nj})$, and antenna element selection matrices $(W_p, W_{pj})$ on indices k and i, respectively.

In some embodiments, $(W_n(k), W_{nj}(k))$, may be determined as a function of the index k. The index k may be a resource index which may include at least one of subcarrier, a set of subcarriers, PRB, PRB-pair, subband, OFDM symbol, and subframe. A predefined or a configured set of vectors/matrices may be used for $(W_n, W_{nj})$, wherein the set of vectors/matrices may be referred to as a codebook. A codebook may have Nc vectors/matrices. A vector/matrix may be interchangeably used with a codeword in a codebook. A modulo operation based on k and Nc may be used to determine a codeword. A codeword from among one or more codewords in a codebook may be cyclically selected based on the resource index k, which may be referred to as codeword cycling or precoder cycling. A random sequence may be used to determine a codeword in a codebook based on the index k. A codeword from among one or more codewords in a codebook may be randomly selected based on the random sequence, which may be referred to as random precoding.

In some embodiments, $(W_p(i), W_{pj}(i))$ may be determined as a function of the index i. The index i may be a resource index which may include at least one of subcarrier, a set of subcarriers, PRB, PRB-pair, subband, OFDM symbol, and subframe. A predefined or a configured set of vectors/matrices may be used for $(W_p, W_{pj})$, wherein the set of vectors/matrices may be referred to as a codebook. A codebook may have Nc vectors/matrices. A vector/matrix may be interchangeably used with a codeword in a codebook. A modulo operation based on i and Nc may be used to determine a codeword. A codeword of one or more codewords in a codebook may be cyclically selected based on the resource index k, which may be referred to as codeword cycling or precoder cycling. A random sequence may be used to determine a codeword in a codebook based on the index i. A codeword of one or more codewords in a codebook may be randomly selected based on the random sequence, which may be referred to as random precoding.

In some embodiments, a WTRU may determine the rate and timing related to the update of $(W_n(i), W_n(i))$ and $(W_p(i), W_{pj}(i))$ through L1/L2 signalling the rate and timing may be configured via higher layer signaling.

In some embodiments, a WTRU may determine (i,k) indices through L1/L2 signaling, determined, or the (i,k) indices may be configured via higher layer signaling.

In some embodiments, a WTRU may measure, estimate, and/or report one or more CQIs based on determined or configured (i,k) indices.

Closed-Loop MIMO Schemes

The composite precoder $W_c$ may be defined as a function of $W_n$ and $W_p$ such as $W_c = f(W_n, W_p)$, wherein the composite precoder $W_c$ may use at least one of CSI feedback, demodulation of downlink data reception, link adaptation for downlink data transmission.

In some embodiments, f(,) may be a function which may be determined, configured, or predefined. For example, f(,) may be at least one of but not limited to Kronecker product represented as $\otimes$, inner product represented as and Hadamard product $\circ$. The function may be determined or used based on at least one of transmission scheme, mode of operation, and number of antenna ports. A first function may be used for a periodic CSI reporting mode while a second function may be used for an aperiodic CSI reporting mode. A first function may be used for an open-loop transmission scheme while a second function may be used for a closed-loop transmission scheme. The function may be determined or used based on a frequency band $f_c$ for the system. For example, a first function may be used for a first frequency band (e.g., $f_c$<6 GHz) while a second function may be used for a second frequency band (e.g., $f_c$>6 GHz).

In some embodiments, $W_c=f(W_n,W_p)$ may be used, configured, or determined as at least one of the following. In one embodiment, $W_c=W_n \otimes W_p$, wherein the $W_p$ may be further characterized with $W_p^1 \cdot W_p^2$. Therefore, it can be expressed as $W_c=W_n \otimes (W_p^1 \cdot W_p^2)$. In some embodiments, $$W_p^1 = \begin{pmatrix} X_1 \otimes X_2 & 0 \\ 0 & X_1 \otimes X_2 \end{pmatrix} \text{ or } W_p^1 = \begin{pmatrix} X_1 \otimes X_2 & X_1 \otimes X_2 \\ X_1 \otimes X_2 & -X_1 \otimes X_2 \end{pmatrix}.$$

In some embodiments, $X_1$ is a $N_1 \times L_1$ matrix with $L_1$ column vectors being an $O_1$ oversampled DFT vector of length $N_1$:

$$v_l = \begin{bmatrix} 1 & e^{\frac{j2\pi l}{N_1 O_1}} & \ldots & e^{\frac{j2\pi(N_1-1)l}{N_1 O_1}} \end{bmatrix}^T.$$

In some embodiments, $X_2$ is a $N_2 \times L_2$ matrix with $L_2$ column vectors being an $O_2$ oversampled DFT vector of length $N_2$:

$$v_l = \begin{bmatrix} 1 & e^{\frac{j2\pi l}{N_2 O_2}} & \ldots & e^{\frac{j2\pi(N_2-1)l}{N_2 O_2}} \end{bmatrix}^T.$$

In some embodiments, $N_1$ and $N_2$ are the numbers of antenna ports per pol in first and second dimension (e.g., vertical and horizontal dimension). In some embodiments, $$W_p^2 = \begin{bmatrix} s_1 \\ as_2 \end{bmatrix},$$

where $s_1$ and $s_2$ may be a column selection vector and a may be a co-phasing element based on a complex number, for example $$s_1 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\} \text{ and } s_2 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\},$$

where $s_1$ and $s_2$ may be a linear combination of column vectors in $W_p^1$.

In some embodiments, a WTRU may report a single $W_p$ which may be associated with all panels used for a composite precoder. For example, each panel may be associated with a CSI-RS configuration and $M_g \times N_g$ CSI-RS configurations may be used for or associated with a composite precoder. A WTRU may determine a single $W_p$ which may be commonly used for all panels (or all CSI-RS configurations) associated with a composite precoder. In some embodiments, a WTRU may use a representative CSI-RS configuration (e.g., a first CSI-RS configuration associated with a first panel) and determine $W_p$ based on the representative CSI-RS configuration, for example a gNB may indicate a representative CSI-RS configuration among the associated CSI-RS configurations, or a WTRU may autonomously determine a representative CSI-RS configuration. In some embodiments, a WTRU may determine $W_p$ which maximizes CQI of a composite precoder. For example, a WTRU may exhaustively search $W_p$ within all $W_p$ candidates and determine $W_p$ which maximizes the CQI of the composite precoder $W_c$.

In some embodiments, the frequency bandwidth (or granularity) for each component precoder of $W_c = W_n \otimes (W_p^1 \cdot W_p^2)$ may be determined based on at least one of following. In one embodiments, a first frequency granularity may be used for $W_p^1$; a second frequency granularity may be used for $W_p^2$; a third frequency granularity may be used for $W_n$. In one embodiment, the first frequency granularity may be equal to or larger than third frequency granularity. In one embodiment, the second frequency granularity may be equal to or smaller than third frequency granularity.

In one embodiment, a panel may be associated with a CSI-RS configuration. In one embodiment, a panel may be associated with a subset of antenna ports in a CSI-RS configuration. For example, a CSI-RS configuration may be used for a composite precoder and a subset of antenna ports may be associated with a panel-specific precoder.

In some embodiments, the component precoder $W_n$ may be generated, determined, used, or configured as a function of one or more sub-component precoders. For example, $W_n = f(W_n^1, W_n^2)$ may be used wherein $W_n^1$ is a first sub-component precoder and $W_n^2$ is a second sub-component precoder. The first sub-component precoder $W_n^1$ may determine a subset co-phasing vectors for panels and the second sub-component precoder $W_n^2$ may determine a co-phasing vector within the subset of co-phasing vectors determined by $W_n^1$. The component precoder $W_n$ may be defined or represented as $W_n = W_n^1 W_n^2$. One or more of following may apply: (i) $W_n^1$ may be a subset of an oversampled DFT matrix, a grassmanian based codebook, a codebook; (ii) $W_n^2$ may be a column selection vector; (iii) $W_n^1$ may be a long-term and a wideband based precoder; (iv) $W_n^2$ may be a short-term and a subband based precoder; (v) in an example, $W_n^1 = [w_1 w_2 \ldots w_L]$, wherein $w_l$, $l=1 \ldots, L$ may be a $N_a \times 1$ co-phasing vector and $W_n^1$ may be $N_a \times L$ matrix and $W_n^2$ may be a column selection vector such as $$W_n^2 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}.$$

The first sub-component precoder $W_n^1$ may be associated with panels in vertical domain and the second sub-component precoder $W_n^2$ may be associated with panels in horizontal domain. The component precoder $W_n$ may be represented as $W_n = W_n^1 \otimes W_n^2$.

In exemplary embodiments, the component precoder $W_p$ may be generated, determined, used, or configured as a function of one or more sub-component precoders. For example, $W_p = f(W_p^1, W_p^2)$ may be used wherein $W_p^1$ is a first sub-component precoder and $W_p^2$ is a second sub-component precoder. The component precoder may be defined or represented as $W_p = W_p^1 W_p^2$ or $W_p = W_p^1 \otimes W_p^2$. One or more precoding structure determined, defined, generated for $W_n^1$ may be used for $W_p^1$, or vice versa. One or more precoding structures determined, defined, or generated for $W_n^2$ may be used for $W_p^2$, or vice versa.

In some embodiments, the composite precoder $W_c$ may be defined or represented as $W_c=f_1(f_2(W_n^1,W_n^2), f_2(W_p^1, W_p^2))$, wherein $f_1(,), f_2(,),$ and $f_3(,)$ may be the same function or a different function. In an example of $f_1(,)=f_2(,)=f_3(,)=\otimes$, the composite precoder may be defined as $W_c=(W_n^1\otimes W_n^2)\otimes(W_p^1\otimes W_p^2)$. In another example of $f_1(,)=f_2(,)=f_3(,)=\otimes$, the composite precoder may be set as $W_c=(W_n^1\otimes W_n^2)\cdot(W_p^1\otimes W_p^2)$. $W_c$ may be determined based on one or more indices. For example, $W_c$ may be determined as a function of one or more of $k_1, k_2, i_1,$ and $i_2$, $W_c(k_1, k_2, i_1, i_2)=(W_n^1(k_1)\otimes W_n^2(k_2))\otimes(W_p^1(i_1)\otimes W_p^2(i_2))$. A WTRU may report one or more of $k_1, k_2, i_1, i_2$ indices. The reporting cycle (or feedback periodicity) may be determined independently per index. The reporting cycle for $k_1, k_2$ may be equal to or longer than that of $i_1, i_2$. A WTRU may be requested to report one or more of $k_1, k_2, i_1, i_2$ indices. A WTRU may be configured or indicated one or more indices. For example, $k_1, k_2$ may be configured or indicated to a WTRU and the WTRU may determine $i_1, i_2$ based on the configured or indicated indices $k_1, k_2$.

In an exemplary embodiment, $W_n$ may be used, determined, or configured as a panel selection vector/matrix. For example, one or more panels (e.g., CSI-RS configurations) may be selected, determined, or indicated with $W_n$ when Mg×Ng panels are configured or used. Table 2 shows an example of a panel selection codebook which may be used for $W_n$ when Mg=2 and Ng=2 are used with $W_c(k,i)=W_n(k)\otimes W_p(i)$, wherein '1' element may indicate the selected panel.

The panel selection codebook may include at least one of following. (i) One or more panel selection vectors/matrices which may select or determine a panel within Mg×Ng panels. (ii) One or more panel selection vectors/matrices which may select a subset of panels within Mg×Ng panels. One or more panel groups may be predefined or configured and a panel group may be selected or determined based on panel selection vector/matrix. (iii) One vectors/matrices which may use all Mg×Ng panels (e.g., Index-13 in Table 2).

The number of panels selected, used, or determined based on at least one of following. (i) The number of layers (e.g., RI) associated with CSI feedback. For example, a single panel may be used, determined, or selected if the number of layers is less than a predefined threshold (e.g., RI<3) and multiple panels may be used, determined, or selected if the number of layers is equal to or higher than the predefined threshold (e.g., RI>=3). (ii) MCS levels. For example, if lower MCS levels are used, all panels may be used for better signal coverage and a subset of panels may be used for a higher MCS level. (iii) Mode of operation. For example, a WTRU in a first mode of operation (e.g., SU-MIMO) may use or determine all panels for a CSI feedback while a WTRU in a second mode of operation (e.g., MU-MIMO) may use or determine a subset of panels for a CSI feedback. (iv) Traffic type. For example, all panels may be used for a first traffic type (e.g., URLLC) and a subset of panels may be used for a second traffic type (e.g., eMBB).

TABLE 2

An example of panel selection vector/matrix $W_n$ for Mg = 2 and Ng = 2.

| Index-0 | Index-1 | Index-2 | Index-3 |
|---|---|---|---|
| $\begin{bmatrix}1\\0\\0\\0\end{bmatrix}$ | $\begin{bmatrix}0\\1\\0\\0\end{bmatrix}$ | $\begin{bmatrix}0\\0\\1\\0\end{bmatrix}$ | $\begin{bmatrix}0\\0\\0\\1\end{bmatrix}$ |
| Index-4 | Index-5 | Index-6 | Index-7 |
| $\begin{bmatrix}1\\1\\0\\0\end{bmatrix}$ | $\begin{bmatrix}1\\0\\1\\0\end{bmatrix}$ | $\begin{bmatrix}1\\0\\0\\1\end{bmatrix}$ | $\begin{bmatrix}0\\1\\1\\0\end{bmatrix}$ |
| Index-8 | Index-9 | Index-10 | Index-11 |
| $\begin{bmatrix}0\\1\\0\\1\end{bmatrix}$ | $\begin{bmatrix}0\\0\\1\\1\end{bmatrix}$ | $\begin{bmatrix}1\\1\\1\\0\end{bmatrix}$ | $\begin{bmatrix}0\\1\\1\\1\end{bmatrix}$ |
| Index-12 | Index-13 | Index-14 | Index-15 |
| $\begin{bmatrix}1\\1\\0\\1\end{bmatrix}$ | $\begin{bmatrix}1\\1\\1\\1\end{bmatrix}$ | — | — |

In another exemplary embodiment, the composite precoder may be defined, configured, constructed, or generated with one or more of individual panel-specific precoder $W_{p,l}$, wherein l may be a panel index (or CSI-RS configuration index), l=1, . . . , Na. For example, the composite precoder may be defined as $W_c=[W_{p,1}|W_{p,2}|\ldots|W_{p,Na}]$, wherein '|' may be used to represent 'stacking' one or more panel-specific precoders $W_{p,l}$.

$$W_c = [W_{p,1} | W_{p,2} | \ldots | W_{p,Na}] = \begin{bmatrix} W_{p,1} \\ W_{p,2} \\ \vdots \\ W_{pNa} \end{bmatrix}$$

In one embodiment, the 'stacking' of panel-specific precoders may be represented as follows. In an embodiment, $W_c=\text{diag}[C_{p,1}C_{p,2}\ldots C_{p,Na}]\cdot W_n$, wherein $C_{p,l}$ may be a precoding vector associated with a panel l without co-phasing across panels and diag[ ] may be a block diagonalization of the panel-specific precoders; and $W_n$ may be Na×1 co-phasing vector across panels. Therefore, after co-phasing across panels, each panel-specific precoder may be expressed as $W_{p,l}$. The co-phasing across panels may be reported as $W_{p,l}$ or reported separately as $W_n$ with panel-specific precoder $C_{p,l}$. In some embodiments, $W_{p,l}$ and $C_{p,l}$ may be used interchangeably, therefore $W_c=\text{diag}[W_{p,1} W_{p,2} \ldots W_{p,Na}]\cdot W_n$. In some embodiments, $C_{p,l}$ may be determined based on its associated CSI-RS configuration, wherein Na CSI-RS configurations may be used for a CSI reporting for a composite codebook.

In some embodiments, $W_{p,l}, C_{p,l},$ and $W_p$ may have a same precoding structure with component precoders (e.g., $W_p^1$ and $W_p^2$). In an embodiment, $W_p^1$ may be common for all panels (e.g., panel common $W_p^1$). Thus, a WTRU may report a single $W_p^1$ for all panels (or all CSI-RS configurations) and the WTRU may report $W_{p,i}^2$ for each panel (e.g., panel l or CSI-RS configuration l). In this case, the codebook structure may be represented as $W_c=\text{diag}[W_p^1 W_{p,1}^2 W_p^1 W_{p,2}^2 \ldots W_p^1 W_{p,l}^2]\cdot W_n$, wherein $W_n$ may be common for all panels. In an embodiment, $W_p^1$ may be a panel-specific (e.g., panel specific $W_p^1$). Thus, a WTRU may report $W_{p,i}^1$ and $W_{p,i}^2$ for each panel (e.g., panel 1 or CSI-RS configuration 1). In this case, the codebook structure may be represented as $W_c$=diag[$W_{p,1}^1 W_{p,1}^2 W_{p,2}^1 W_{p,2}^2$ . . . $W_{p,i}^1 W_{p,i}^2$]·$W_n$, wherein $W_n$ may be common for all panels. In some instances, $W_n$ may be reported with a same frequency granularity with $W_p^1$. In some instances, $W_n$ may be reported with a same frequency granularity with $W_p^2$. In some instances, the frequency granularity of $W_n$ may be determined based on at least one of following: an indication in an associated DL control information which may be used to trigger aperiodic or semi-persistent CSI reporting; a number of panels (or a number of CSI-RS configurations associated with a composite precoder); a frequency band used (e.g., center frequency); and a CSI reporting setting used.

In some embodiments, the use of panel common $W_p^1$ or panel-specific $W_p^1$ may be determined based at least one of following. In an embodiment, an antenna calibration status across panels (e.g., timing and frequency offset), wherein the antenna calibration status may be indicated as QCL. If a predefined QCL parameters are QCL-ed across panels (or across CSI-RS configurations), a panel common $W_p^1$ may be used; otherwise, a panel-specific $W_p^1$ may be used. In an embodiment, a dynamic indication (e.g., DCI or MAC-CE) when the CSI reporting is triggered. For example, when aperiodic CSI reporting or semi-persistent CSI reporting is triggered, the triggering information may include which type of $W_p^1$ is used. In an embodiment, a higher layer signaling may be used to indicate which types of $W_p^1$ is used.

In one embodiment, a WTRU may report one or more panel-specific precoders $W_{p,i}$. A WTRU may report a set of panel-specific precoders associated with one or more panels (e.g., CSI-RS configurations) while the WTRU may report CQI and RI based on $W_c$. A WTRU may report a subset of panel-specific precoders which may be changed. A WTRU may report one or more panel-specific precoders with its associated panel index (e.g., CSI-RS configuration index).

In one embodiment, a WTRU may determine a first composite precoder structure $W_c$=[$W_{p,i}|W_{p,2}|$ . . . $|W_{p,Na}$] or a second composite precoder structure $W_c$=$W_n \otimes W_p$ based on at least QCL type or status. For example, a second composite precoder structure may be used if all CSI-RS configurations are QCL-ed for a predefined set of QCL parameters; otherwise, a first composite precoder structure may be used. In some instances, the predefined set of QCL parameters may be a QCL type predefined or a subset of QCL parameters. In some instances, a first composite precoder may use individual reporting of $W_p$ for each panel while a second composite precoder may use common reporting of $W_p$ for all panels.

In one embodiment, a WTRU may use a first composite precoder structure $W_c$=diag[$C_{p,1} C_{p,2}$ . . . $C_{p,Na}$]·$W_n$.

In certain cases, it may be possible that the relative phase between antenna panels may drift, for example if each panel has an individual local oscillator and the local oscillators are not perfectly synchronized. In this case, it may be desirable that one the physical antennas that are virtualized to an antenna port belong to the same panel.

In an exemplary embodiment, a WTRU may report a relative phase drift information between panels (e.g., CSI-RS configuration). One or more CSI-RSs may be transmitted from different panels and these CSI-RSs may be measured by the WTRU to report a relative phase drift between one or more CSI-RS configurations.

The WTRU may determine the phase drift associated with each CSI-RS. The WTRU may either feedback the absolute value of the phase drifts associated with each CSI-RS, or a relative phase drift value.

In another embodiment, instead of the phase value, the WTRU may feedback the frequency offsets of the antenna panels.

Uplink Sounding Reference Signal Transmission

In a solution, a WTRU may transmit one or more sounding reference signals (SRS) through one or more panels. One or more of following may apply.

One or more sets of SRS ports may be used for the SRS transmission and each set of SRS ports may be associated with a panel. For example, a first set of SRS ports (e.g., SRS ports #0~#3) may be associated with a first panel and a second set of SRS ports (e.g., SRS ports #4~7) may be associated with a second panel, wherein the SRS ports in a different set may be mutually exclusive.

One or more SRS group numbers (or indices) may be used to indicate the associated panel information. For example, an SRS transmission in a determined time/frequency location may be associated with an SRS group. A WTRU may transmit an SRS associated with a certain SRS group in a time/frequency resource which may be determined, configured, indicated, or used for the associated SRS group. A WTRU may transmit an SRS with an associated SRS group index, wherein the SRS group index may be indicated by an SRS reuse pattern (e.g., time/frequency locations), a scrambling sequence for the SRS, and an explicit indication via an uplink control channel.

One or more quasi-collocation (QCL) indications may be used. For example, a WTRU may indicate or report a quasi-collocation (QCL) information for the SRS ports across panels. For example, if a common local oscillator is used for all panels at a WTRU transmitter, the WTRU may indicate that all SRS ports are quasi-collocated (e.g., QCL='TRUE') while individual local oscillator is used for each panel at a WTRU transmitter, the WTRU may indicate that SRS ports are not quasi-collocated (e.g., QCL='FALSE'). If QCL='FALSE', SRS ports in a SRS group may be considered or assumed as quasi-collocated while SRS ports across different SRS groups may be considered or assumed as non-quasi-collocated. A WTRU may indicate an associated SRS group index for an uplink transmission (e.g., data and/or control). For example, a WTRU may transmit an uplink data transmission (e.g., PUSCH) with an associated SRS group index which may be quasi-collocated with the data transmission. The SRS group index and QCL index may be used interchangeably. The SRS group index may be indicated in an associated uplink control information. A WTRU may transmit an uplink control information via a predetermined, configured, or indicated panels.

A WTRU may be provided with an indication of a phase offset between panels (or SRS groups) which may be transmitted from an eNB for an uplink transmission. The phase offset may be signaled via higher layer signaling (e.g., RRC signaling).

In an exemplary embodiment, a WTRU may transmit a sounding reference signals (SRS) which may be precoded with a precoding vector/matrix computed, determined, or used by the WTRU or with a precoding matrix configured, indicated, or determined by a central controller (e.g., eNB).

The precoding vector/matrix may be composed of multiplication of sub-matrices (or sub-component matrices)

including a precoding matrix used for digital beamforming, and/or a precoding matrix used for analog beamforming, etc.

The precoding vector/matrix determined by WTRU for SRS transmission may be indicated to an eNB. The indication may be transmitted via an uplink control signal.

In another embodiment, one or more SRS may be transmitted by the WTRU. The antennas used to transmit a SRS may belong to one panel or more than one panel. In an example, antennas on only one panel may be virtualized to an SRS port (or a set of SRS ports); while in another solution, antennas on different panels may be virtualized to the SRS port (or set of SRS ports).

The WTRU may compute or determine a precoding matrix for uplink transmission using the signals transmitted in the downlink. The matrix used to precode an SRS may be completely determined by the WTRU based on downlink signals, e.g. downlink reference signals, or it may partially be determined by the WTRU and partially by the eNB.

The SRS may be non-precoded and one SRS may be transmitted from the antennas on a single panel.

The SRS may be non-precoded and one SRS may be transmitted from the antennas on a group of panels where a group may consist of more than one panel.

A phase vector/matrix may be determined by the eNB and transmitted from the eNB to the WTRU that may be used to co-phase the transmissions from different groups of panels.

The SRS may be precoded where the precoding matrix may be based on analog beamforming and create a wide beam where one beam may be transmitted form the antennas on a single panel.

The SRS may be precoded where the precoding matrix may be based on analog beamforming and create a wide beam where one beam may be transmitted from the antennas on a group of panels where a group may consist of more than one panel.

The SRS may be precoded where the precoding matrix may be based on a combination of analog and digital beamforming, and one beam may be transmitted form the antennas on a single panel.

The SRS may be precoded where the precoding matrix may be based on a combination of analog and digital beamforming, and one beam may be transmitted form the antennas on a group of panels where a group may consist of more than one panel.

In some embodiments, the channel reciprocity may also be used to determine beamforming matrices for UL data transmission based on beamforming matrices used for the reception of downlink data reception.

In one example, the data to be transmitted in the uplink direction may be precoded with the beamforming matrix that is used at the receiver to receive the downlink transmission. The same antenna to antenna port virtualization applied for the receiver may be used for the transmitter. For example, if one beam per multiple panels are used as a receive beam, the same beam transmitted from the same panels may be used for uplink transmission. If multiple beams per different groups of panels are used as the receive beams, the same beams transmitted from the same groups of panels may be used for uplink transmission.

In another example, the widths of the beams generated at the WTRU to receive (using receive beamforming) and transmit (using transmit beamforming) may be different due to the differences in the transmit and receive hardware. For example, transmit beams may be wider than receive beams. In this case, the beam used for uplink data and/or SRS transmission may be derived based on the downlink beam used for data reception. For example, the UL beam may be a beam in the same direction as the DL beam, but with wider beamwidth.

SU/MU-MIMO Schemes

In an exemplary embodiment, an eNB may configure precoded CSI-RS signals to form multiple beams and the WTRUs report the CSI.

In some such embodiments, a beam may be transmitted from one panel. A WTRU may report to the eNB the beam index for the beams that have the best channels. The number of best channels to report could be determined by the eNB and sent to the WTRU as configuration, and it could be one or two or more. The metric on the channel quality may be the capacity of the channel or the rank of the channel. This information may be used by the eNB to select the panels for the WTRUs.

In other such embodiments, a beam may be transmitted from more than one panel. The behavior of the WTRU and the eNB may be the same as that in the previous case. This may offer higher beamforming capability for the transmission from the eNB to the WTRU, which may be beneficial in supporting ultra-reliability communication. A WTRU may report the beam index to the eNB, and the eNB may use such information from all the WTRUs in determining the panel selection.

Further embodiments employ a mixture of the above two schemes. Among all the beams, at least one beam is transmitted from one panel, and at least another beam is transmitted from multiple panels.

In the above embodiments, a panel may be used possibly together with other panels to transmit multiple beams.

A beam index l may be associated with a number of parameters: $l=g(p, i, k, M)$, where p indicates the panels used for the transmission of the CSI-RS signal, for example, indicated by the panel selection vector/matrix $W_n$ in Table 2, i may indicate the subbands, k may indicate the resource elements, and M may be the index of a precoding matrix.

Alternatively, the eNB may transmit CSI-RS signals that are not precoded. One or more panels may be used for the transmissions. In this case, each WTRU measures and estimates the channel, and finds the dominant eigendirections of the channel and reports that information back to the eNB. The eigendirections may be quantized by using a DFT based codebook or a Grassmanian based codebook, and the codewords of the dominant eigendirections may be fed back to the eNB. Since a CSI-RS signal may be transmitted from one panel or a collection of panels, an index such as the panel selection vector/matrix $W_n$ in Table 2 may be used to indicate this. This information is fed back to the eNB as well. The eNB may form beams according to the reported eigendirections from the WTRUs, for example, a beam that matches the strongest eigendirection of the channel of a WTRU.

The eNB may restrict the panels of which a WTRU reports the CSI which may include PMI, RI, or CQI. This may significantly reduce the CSI feedback overhead. The restriction may be applied according to one of the following approaches. On a per-WTRU basis, a restriction is applied to a WTRU individually. Each panel or collection of panels may have an index, which may correspond to the panel selection vector/matrix $W_n$ defined in Table 2. The panels of which WTRUs report CSI may be disjoint. For example, the eNB may ask WTRU 1 to report about panel 3, and WTRU 2 to report about panel 1 and panel 2. On a per-group basis, a restriction is applied to a group of WTRUs. The eNB may ask a group of WTRUs to report the CSI of a particular panel or a collection of panels. The grouping may be based on the location/direction information of the WTRUs. For example, WTRUs in a similar direction relative to the eNB may be assigned to the same group.

The CSI restriction may be configured by the eNB and sent to the WTRUs over a control channel. In the case of WTRU-based CSI reporting restriction, the eNB sends the restriction on a per-WTRU basis. In the case of group-based CSI reporting restriction, the eNB may configure all WTRUs in a group to receive the CSI reporting restriction on a common set of time-frequency resource, e.g., multicasting the restriction to all the WTRUs in a group, and this could significantly reduce the amount of resource used for control purposes.

The restriction may be based on the need of the high-level scheduling, that is, which panels would be potentially used for transmissions to a particular WTRU or a subset of WTRUs.

The eNB may determine the precoding matrices based on the CSI feedback from the WTRUs such that the mutual interference among the WTRUs is minimized. For example, if the strongest eigendirections for WTRU 1 are $v_i$, $v_2$, and that for WTRU 2 are $u_1$ and $u_2$. The eNB may choose $u_i$ and $u_j$ such that $$(i, j) = \operatorname*{argmin}_{m=1,2;n=1,2} |v_m^H u_n|,$$

where H stands for transport conjugate, and determine the precoding matrix accordingly.

It may be desirable in some instances to switch between SU-MIMO and MU-MIMO, and it may be desirable to reconfigure the number of the number of panels and/or TXRUs for a WTRU in satisfying quality of service (QoS) requirements from the applications. For example, if the traffic is of URLLC type, it may be reasonable to assign dedicated time-frequency resources to the WTRU involved to minimize interferences from transmissions intended for other WTRUs, such that the time-frequency is used in an SU-MIMO mode; also, the number of panels and/or TXRUs to be used for that WTRU may increase. In another example, if there are many WTRUs, all of which require moderate throughput and reliability, a certain amount of time-frequency resource may be allocated to them and the transmissions may be in the MU-MIMO mode; also the number of panels used for a WTRU may be reduced to 1. A criterion may be used to determine when the switching takes place, and the criterion may depend on the QoS satisfaction that has been achieved and the priority of the traffic flows/users, and the decision may come from the upper layer. The following shows an example of the decision on the switching:

The configuration on the switching may be sent from the eNB to the WTRU through the downlink control channel.

Multi Component Precoder with Hybrid Beamforming.

In hybrid beamforming, a combination of analog and digital beamforming may be used. A multi-component hybrid beamforming precoding structure may be used for a massive antenna configuration. In this case, the composite digital precoder discussed earlier may be combined with a composite analog precoder.

In an exemplary embodiment, the precoder that modifies the data may be set as $$W_{DATA} = f_a(W_{na}, W_T W_{RS} W_c)$$

where the function to determine or construct the composite hybrid precoder may be configured, used, determined, predetermined or selected based on the same or similar parameters or factors as the composite digital precoder discussed above, such as (i) the transmission scheme used, configured or determined; (ii) the MIMO mode of operation used, configured or determined; (iii) the operating frequency band; (iv) the number of panels configured, used or determined in the massive antenna configuration.

Note that in this embodiment, the composite digital precoder becomes a component of the hybrid analog-digital precoder and the composite digital precoder function, f, may be a function of the hybrid function, $f_a$. As an example, in one method, the hybrid function may be fixed and then the composite digital precoder estimated based on an independent function.

$W_{na}$ may be set as the analog extension matrix for multi-panel precoding in the analog domain wherein the analog extension matrix may be interchangeably used with panel selection vector/matrix, panel co-phasing vector/matrix, and panel selection precoder, panel co-phasing precoder but still consistent with an embodiment.

$W_T$ may be set as the analog precoder between the TXRU to the antenna elements within a panel while $W_{RS}$ may be set as the precoder between the CSI-RS port the TXRU. For no-precoder CSI-RSs, $W_{RS}$ is equal to the identity matrix, while for beamformed CSI-RSs, $W_{RS}$ is equal to a zero vector with 1 in the positon of the selected beam(s). $W_c$ is the component digital precoder previously described.

For hybrid beamforming, CSI at the transmitter may make use of knowledge of all the elements of $W_{DATA}$ at the transmitter. This knowledge may be acquired by a mixture of configuration settings and feedback where the feedback may be explicit or implicit. Explicit feedback may include at least one of following: (i) a numerical representation of the element e.g. quantized versions of each vector/matrix; (ii) a compressed representation of the element e.g. quantized and compressed versions each vector/matrix or time/frequency differential versions of each vector/matrix. Implicit feedback may include at least one of following: (i) a CQI/PMI/RI representation of the element; (ii) a metric tied to a specific

---

Determine the traffic flow with the highest priority, let the flow ID be j, and the WTRU receiving flow j be α(j)
if (delay_of_flow_j > delay_requirement_j) or (latency_of_flow_j > latency_requirement_j)
then
    decrease the number of users assigned to the resources being used by WTRU α(j)
    increase the number of panels for WTRU α(j)
else
    increase the number of users assigned to the resources being used by WTRU α(j)
    decrease the number of panels and/or TXRUs for WTRU α(j)
end instance of the element e.g. the SNR or RSSI and index of each vector matrix to enable the eNB/TRP identify the performance of a specific instance.

In hybrid beamforming, $W_{DATA}$, may be found by a two-stage procedure. In first stage of the procedure, the network may set $W_{na}$ (the multi-panel analog combining method) and $W_{RS}$ (the CSI-RS type). The WTRU may then find the best analog beamformer, $W_T$, based on the parameters determined in the first stage. The WTRU feeds back $W_T$ to the base station or eNB/TRP. This may be a single index (the best eNB beam) or a series of indices (the best-N beams or the quality of the link with a specific beam). In the second stage of the procedure, the eNB/TRP fixes $W_T$, and may then request the WTRU to estimate $W_c$ and feed back the components of $W_c$ as discussed further below.

In another embodiment, the precoder that modifies the data may be set as $$W_{DATA} = f(W_n, W_T W_{RS} W_c)$$

This embodiment may assume independent analog precoding for each panel with all panel combination occurring at the component digital precoder.

CSI Feedback with Multi-Component Precoder.

CSI Reporting Types and Procedures

In hybrid beamforming, $W_{DATA}$, is may be found, constructed, or generated by a two-stage procedure. In a first stage of the procedure, the network sets the analog precoder. The network may set $W_{na}$ (the multi-panel analog combining method) and $W_{RS}$ (the CSI-RS type). This may be dynamically signaled to the WTRU in a downlink control channel (a dedicated or shared control channel) or may be semi-statically set in the system parameters (for example by the broadcast channel).

The WTRU may then find the best analog beamformer, $W_T$, based on the parameters set in the first stage. The WTRU may then feed back a representation of $W_T$ to the base station or eNB/TRP. The precoder, $W_T$, may be derived from a predetermined beam set (an analog beam codebook) or a family of predetermined beam sets (an analog beam codebook family to allow for changing the resolution of the beams). The precoder, $W_T$, may be implementation specific with the TRP/eNB defining the analog beams as it sees fit. In this case, the TRP/eNB may signal the number of beams and/or index of beams during the beam discovery procedure to enable the WTRU identify the best beam(s).

The WTRU may then feed back information on $W_T$. In one solution, the WTRU may feed back information on a single beam. Feedback may include but not be limited to the following: (i) beam identification information such as the beam index, panel index, and/or beam direction of arrival; (ii) beam timing information such as the time-slot in which the beam was measured or the relative delay of each beam measurement with respect to the first energy arrival in the case of a time domain measurement; (iii) beam quality information such as the quality of the beam measured by the metrics such as the SNR, or RSSI. The single beam may be the beam the WTRU desires (the best beam). Alternatively, the single beam may be the worst beam (the beam the WTRU desires least to assist in MU-MIMO transmission).

In one embodiment, the WTRU may feed back information on all or a subset of beams. The feedback elements may be similar to the feedback elements identified in for the single beam. In this case, this allows the eNB/TRP to (a) select the best beam(s) for transmission or (b) enable optimal transmission with any selected beam. Analog beamforming may be performed across each component carrier/frequency band for each independent polarization. Alternatively, a single analog beamformer may be used for the entire WTRU for a reduction in complexity, although this may be at some cost to performance. In both cases, the additional digital precoding may be used to recover some of the performance loss that may be seen when compared with pure digital precoding. Typically, $W_T$ feedback may occur based on the analog beam discovery procedure timing. This may be periodic or aperiodic but is typically at a much larger interval than the timing required for the digital precoding feedback.

In the second stage of the procedure, the eNB/TRP fixes $W_{na}$ (the multi-panel analog combining method), $W_{RS}$ (the CSI-RS type) and $W_T$ (the analog beamformer), and may then request the WTRU to estimate $W_c$ and feed back elements identifying $W_c$.

As $W_c(k)$ is a function of both $W_n(k)$ and $W_p(k)$, both the WTRU and eNB/TRP are equipped with information on the function to be used in constructing the composite precoder. The WTRU uses this information to enable proper estimation of the composite precoder, and the eNB uses this information to enable it to send the proper beam or common reference signals. The function (or set of functions) may be determined, configured, or predefined by the network in a static, semi-static, or dynamic manner. The function (or set of functions) may be determined, configured, or predefined autonomously by the WTRU in a static, semi-static, or dynamic manner. For WTRU-defined modes, the WTRU may feed back the function to be used on a dedicated feedback channel, by a request on the RACH channel, or any other uplink control channel. The function may be indicated by a predefined index.

The network may set $W_n(k)$ (the digital multi-panel composite combining method). Alternatively, each WTRU may autonomously define specific values of $W_n(k)$ and request the network to send measurement information for that specific value. Feedback for $W_n(k)$ may be as follows.

In one method, the WTRU may immediately feed back the components of $W_c(k)$ once a measurement packet is received. As both the eNB/TRP and WTRU know $W_n(k)$, there is no need to feed this back. As such, the WTRU may feed back a representation (e.g. an index or an explicit number) that identifies $W_p(k)$ as a single feedback element or feeds back representations of its components ($W_p^1(k)$ and $W_p^2(k)$).

In one method, the WTRU may feed back $W_n(k)$ in addition to $W_c(k)$. This may occur to provide the WTRU with the flexibility of feeding back the information at different times or the eNB may send multiple measurement frames with different values of $W_n(k)$. In this case, the feedback may signal $W_n(k)$ and then all elements of $W_c(k)$. Alternatively, the feedback may signal $W_n(k)$, for each value of $W_c(k)$. Alternatively, the feedback may signal elements of $W_c(k)$ common to all $W_n(k)$ and then feedback $W_n i(k)$ and the corresponding elements of $W_c(k)$ specific to individual value of $W_n(k)$. In a simple example, $W_n(k)$ may signal the panel in a panel selection vector/matrix, indicating that the subsequent feedback is for a single panel. This enables explicit panel selection and panel specific CSI reporting. In a simple example, $W_n(k)$ may signal the effective co-phased panels in a co-phasing implementation indicating the subsequent feedback is for the specific co-phased panels.

For open loop and semi-open-loop transmission schemes, the feedback representing $W_n(k)$ may be an index representing a codeword in a codebook representing a predefined or configured set of vectors/matrices with each index representing the feedback for a specific resource index. Alternatively, the feedback representing $W_n(k)$ may be a quantized angle, $\theta$, from which a phase shift vector/matrix may be constructed. Note that in the case where the phase shift vector elements are not related, each element in the phase shift vector may be fed back independently (e.g., $\theta_0$, $\theta_1$, $\theta_2$, and $\theta_3$ in a four-element vector).

For closed loop MIMO schemes, feedback may involve identifying the combining function to be used in the case that $W_n(k)$ is constructed from a set of sub-components. This may be determined, configured, or predefined by the network or autonomously by the WTRU. Feedback may further involve identifying the sub-component precoder methods to be used in the case that $W_n(k)$ is constructed from a set of sub-components. This may be determined, configured, or predefined by the network or autonomously by the WTRU. Feedback may further involve feeding back the sub-component values of $W_n^1(k)$ and $W_n^2(k)$ as needed. In some embodiments, the feedback may be an index representing a codeword in a codebook. In some embodiments, the feedback may be an index identifying a column in a column selection vector. In some embodiments, the feedback may be an index representing a codeword identifying a long term and/or wideband based precoder. In some embodiments, the feedback may be a compressed/uncompressed quantized data stream identifying a long term and wideband based precoder or a short-term and sub-band based precoder. In some embodiments, the feedback may be a time or frequency differential data stream identifying a long term and wideband based precoder or a short-term and sub-band based precoder. In some embodiments, the feedback may be an index identifying panels in the vertical and horizontal domain. Feed back of $W_n(k)$ may be requested by the eNB/TRP or initiated by the WTRU. It may be periodic or aperiodic and may occur at a different timing from the other elements in the multi-component feedback framework.

At the sub-component precoder level, it may be desirable to provide information identifying the combining functions $f_1(,)$, $f_2(,)$, and $f_3(,)$ to enable the WTRU to estimate the proper values of the components $W_p^1(k)$ and $W_p^2(k)$. In some embodiments, the function (or set of functions) may be determined, configured, or predefined by the network or autonomously by the WTRU in a static, semi-static, or dynamic manner. In some embodiments, the feedback $W_p^1(k)$ and/or $W_p^2(k)$ may be based on implicit feedback represented by a PMI from a vector/matrix codebook representing wideband and longterm feedback or sub-band and short term feedback. Additional channel quality information such as an SNR, an SINR, or an RSSI as well as a rank may also be fed back. In some embodiments, information identifying the feedback component, type and function for example $f_1(,)$, $f_2(,)$, $f_3(,)$, $W_n^1$, $W_n^2(k)$, $W_p^1(k)$, and $W_p^2(k)$ may also be fed back. The WTRU may also feed back assumptions used in creating the composite feedback (both analog and digital) for example ($W_{na}$, $W_{RS}$ and $W_T$). In some embodiments, the feedback $W_p^1(k)$ and/or $W_p^2(k)$ may be transmitted in an aperiodic or periodic manner. In some embodiments, for MU-MIMO, feedback that identifies the best or worst PMI for $W_p^1(k)$ and/or $W_p^2(k)$ may also be enabled. In some embodiments, $W_p^1(k)$ and/or $W_p^2(k)$ may be fed back in an explicit manner without any assumption of a Tx/Rx multi-antenna scheme. Examples may include quantized and compressed/uncompressed channel coefficients, channel covariance vectors/matrices, or dominant eigenvectors. In some embodiments, the component feedback may be a hybrid of implicit and explicit feedback. In one example, the long term information may be sent back implicitly and the short term information may be sent back as an explicit difference from the long term information. This example allows for high accuracy with low overhead due to the fact that the differential information may be small.

Figure 8:
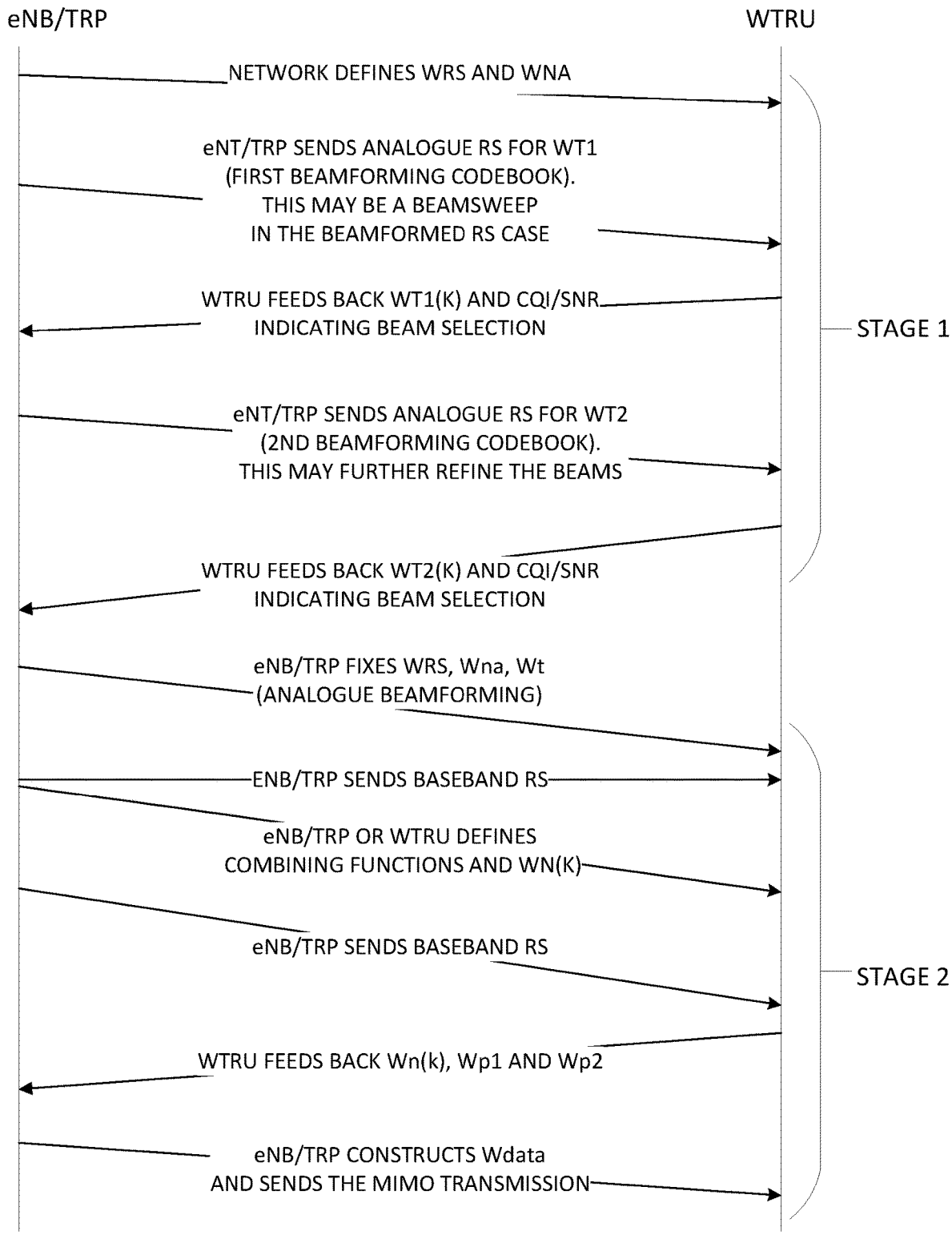
FIG. 8 illustrates an exemplary two-stage feedback process.

An exemplary two-stage procedure with feedback is shown in FIG. 8, with the feedback shown with underlining.

UL Channel for CSI Reporting

A WTRU may feedback the results of panel selection report(s) to assist eNB or TRP for beamforming. A WTRU may select the best K panels according to the measured signal or channel quality via reference signals. Alternatively, a WTRU may use a threshold to select the panels. When the signal or channel qualities of the panels exceed the threshold, the panels are selected. Once the panel is selected, WTRU may report the result of selected panel as well as the associated CSI feedback such as RI, CQI and PMI as well as CRI. Since eNB or TRP may use the panels that are selected and reported by WTRU, the importance of the report panel is high priority. If the reported panel is not correct, the corresponding RI, PMI and CQI will be wrong since they are based on the selected panel.

To avoid such errors, in exemplary embodiments, uplink control channel is configured such that a high level of protection is given to the panel report. When panel selection and CSI are fed back simultaneously, one option is to use PUCCH to carry such control information. Another option is to use PUSCH or multiplex uplink control information with data using PUSCH. The panel selection report may be placed nearby or adjacent to reference signal for enhanced channel estimation performance. When uplink control information is multiplexed with UL-SCH data using PUSCH, the coded panel selection report may be placed next to the HARQ ACK/NACK symbol position.

Figure 9:
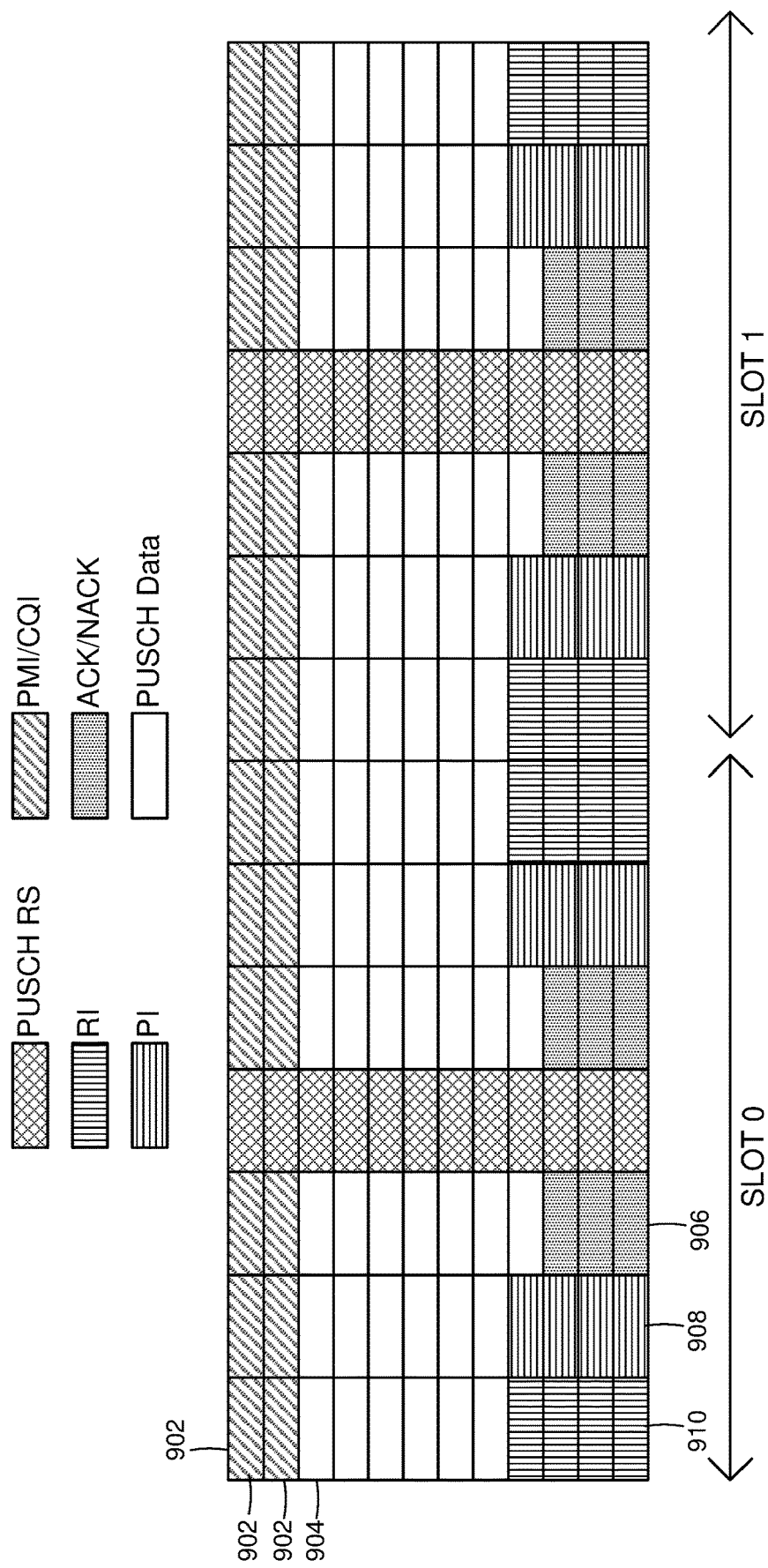
FIG. 9 illustrates an example of uplink control multiplex with UL-SCH on PUSCH including panel indicator.

In the embodiment shown in FIG. 9, PMI/CQI resources 902 are placed at the beginning of UL-SCH data resources and mapped sequentially to all symbols on one subcarrier before continuing on to the next subcarrier. The UL-SCH data is rate-matched around PMI/CQI data. The same modulation order as UL-SCH data on PUSCH 904 may be used for PMI/CQI 902.

The HARQ ACK/NACK resources 906 are placed next to resource elements by puncturing the UL-SCH PUSCH data 904. Positions next to the RS are used to benefit from the best possible channel estimation. The coded panel selection report or panel indicator (PI) 908 are placed next to the HARQ ACK/NACK symbol positions 906. This may be irrespective of whether ACK/NACK is actually present in a given subframe. RI 910 may be placed next to the PI symbol positions 908. The coding of PI and RI as well as PMI/CQI may be separate. UL-SCH data may be rate matched around the PI and RI Res. This is similarly to the case of PMI/CQI.

Figure 10:
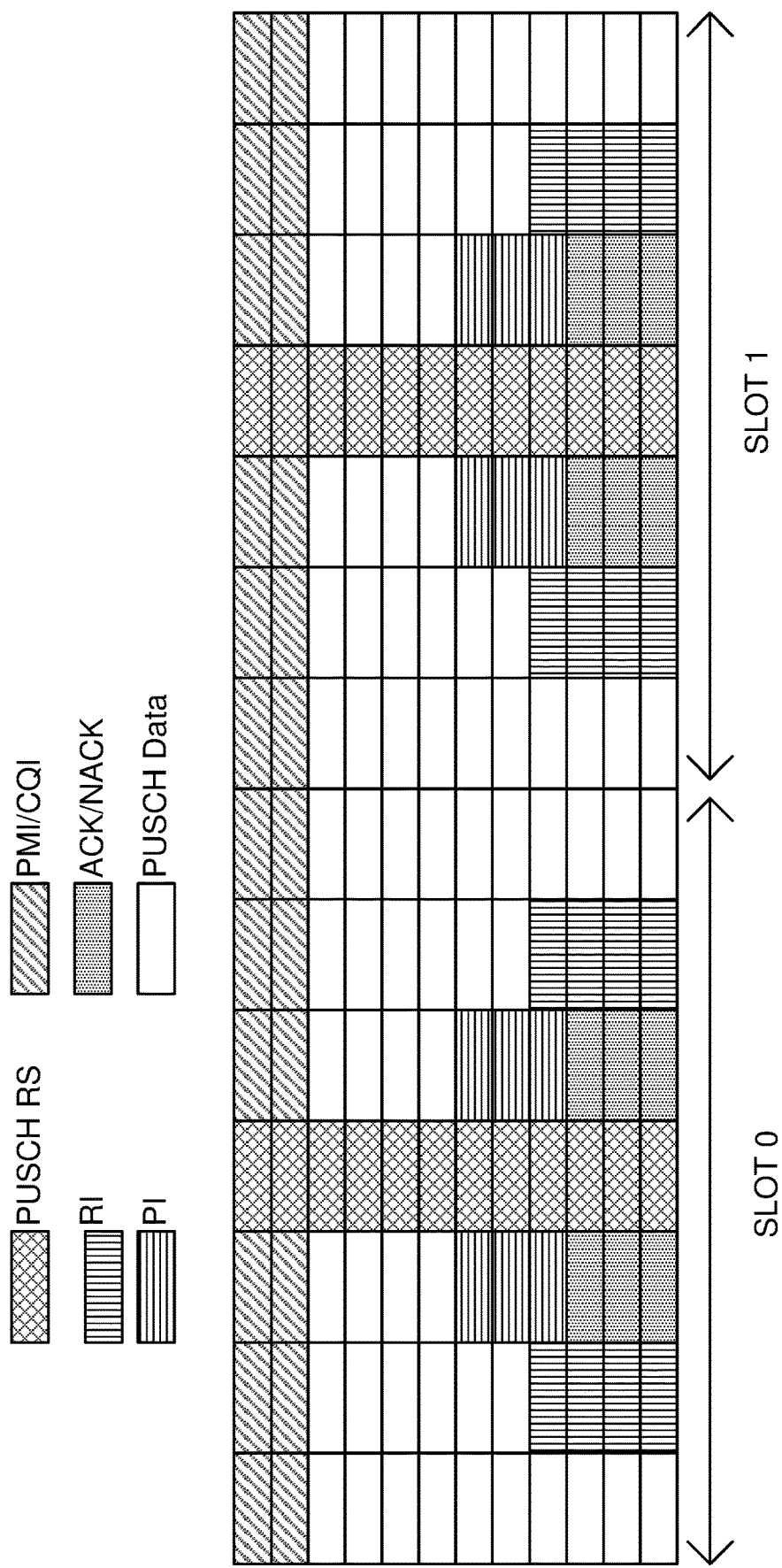
FIG. 10 illustrates another example of uplink control multiplex with UL-SCH on PUSCH including panel indicator.

Another example is shown in FIG. 10. In the embodiment of FIG. 10, positions next to the RS are used to benefit from the best possible channel estimation. The coded panel selection report or panel indicator (PI) are placed next to the RS symbol positions, similar to HARQ ACK/NACK. This may be irrespective of whether ACK/NACK is actually present in a given subframe. RI may be placed next to the PFACK/NACK symbol positions. Similarly, the coding of PI and RI as well as PMI/CQI may be separate. UL-SCH data may be rate matched around the PI/RI and PMI/CQI REs.

Figure 11:
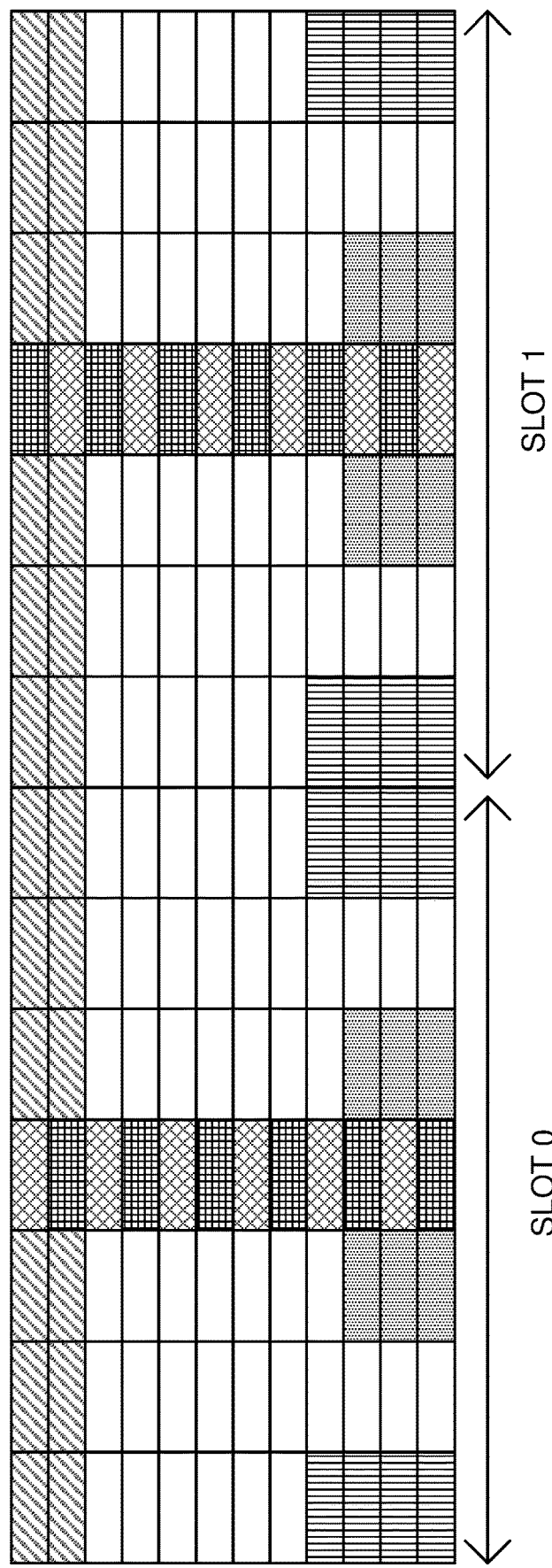
FIG. 11 illustrates another example of uplink control multiplex with UL-SCH on PUSCH including implicit panel indicator.

In a further embodiment a panel indicator may also be indicated implicitly. In one example of this each panel may use a unique PUSCH RS configuration which can be used to identify the panel in use. Examples of this are shown in FIGS. 10 and 11. Other types of RS definitions may be used for this implicit indication. For example, there could be a panel specific DMRS specification which may be used in addition to the PUSCH RS and may also indicate the panel.

Figure 12:
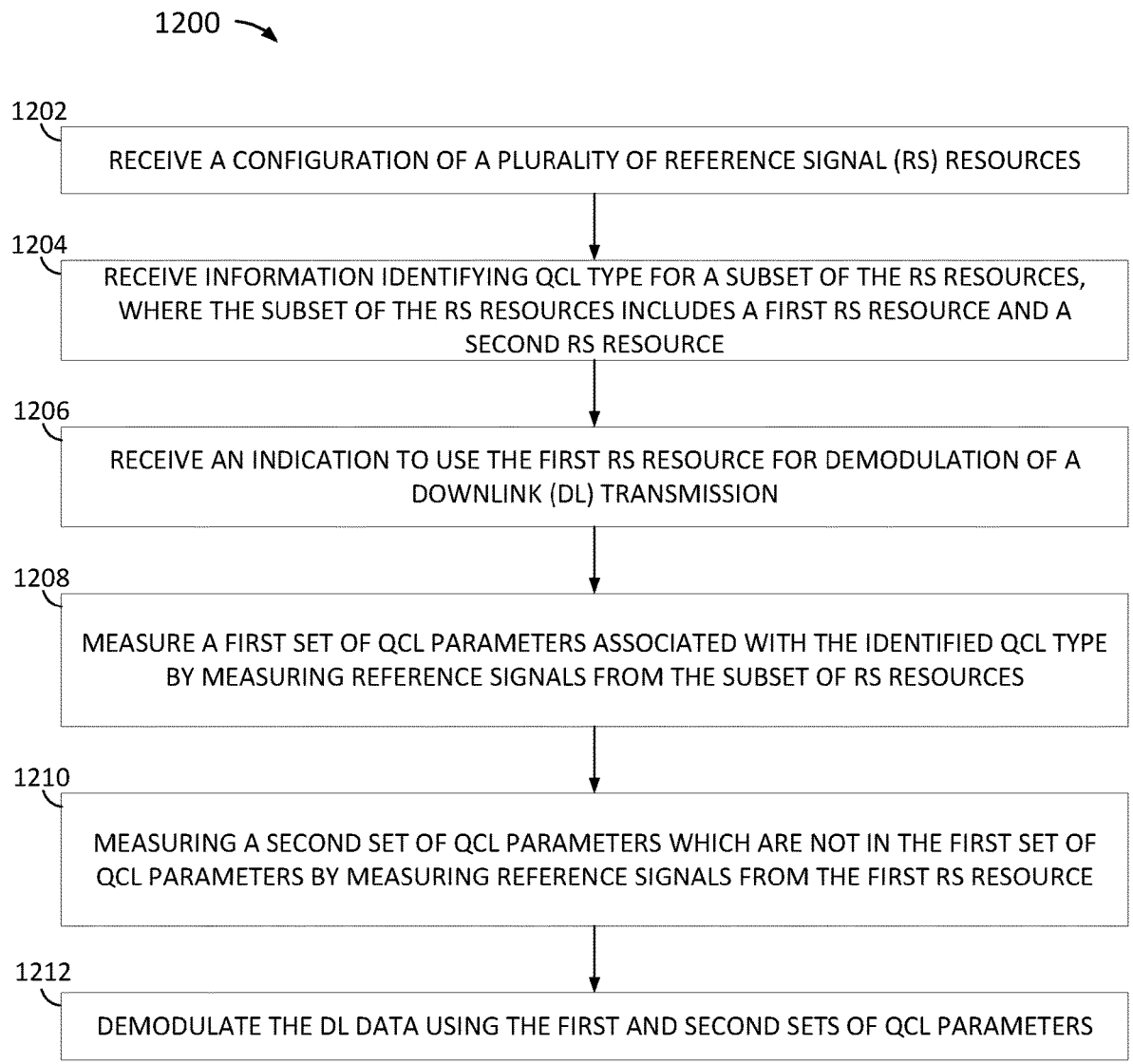
FIG. 12 is a flowchart of a method of using measurement reference signals (RS) to receive data.

FIG. 12 is a flowchart of a method 1200 of using measurement reference signals (RS) to receive data. Method 1200 may be performed at a WTRU.

At 1202, a configuration of a plurality of reference signal (RS) resources is received.

At 1204, information is received identifying a quasi-collocation (QCL) type for a subset of the RS resources, where the subset of the RS resources includes a first RS resource and a second RS resource.

At 1206, an indication is to use the first RS resource for demodulation of a downlink (DL) data transmission is received.

At 1208, a first set of QCL parameters associated with the identified QCL type is measured by measuring reference signals from the subset of RS resources.

At 1210, a second set of QCL parameters which are not in the first set of QCL parameters is measured by measuring reference signals from the first RS resource.

At 1212, the DL data is demodulated using the first and second sets of QCL parameters.

In an embodiment, at least one QCL type indicates full QCL of RS resources, a second QCL type indicates partial QCL of RS resources, and QCL parameters corresponding to partial QCL of RS resources are a subset of the QCL parameters corresponding to full QCL of RS resources.

In an embodiment, the QCL parameters corresponding to full QCL of RS resources include one or more of delay spread, Doppler spread, frequency shift, average received power, received timing, and beam index.

In an embodiment, the first or second set of QCL parameters is at least one of an empty set, a subset of the QCL parameters for full QCL, and all of the parameters for full QCL.

Figure 13:
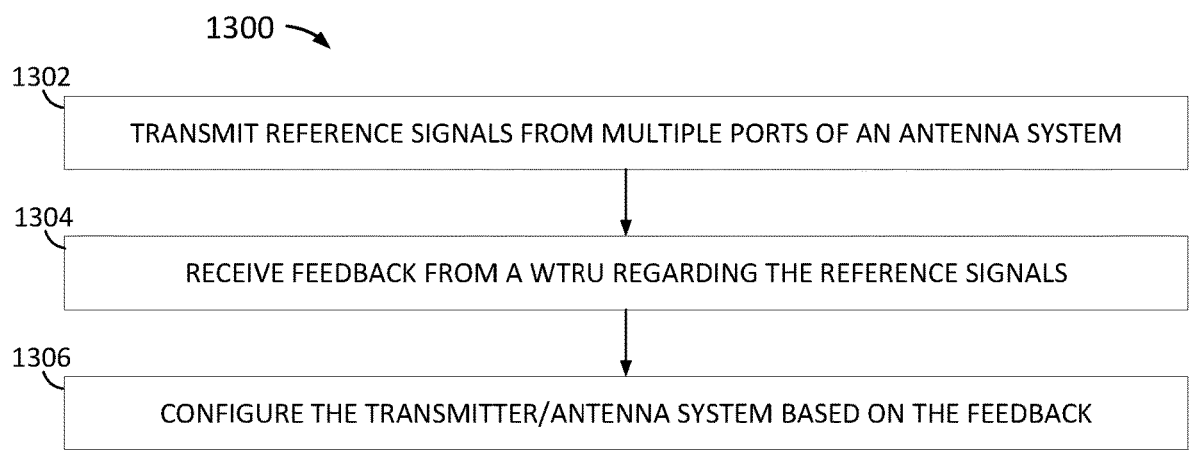
FIG. 13 is a flowchart of a method of configuring a transmitter and/or antenna system based on feedback from a WTRU.

FIG. 13 is a flowchart of a method 1300 of configuring a transmitter and/or antenna system based on feedback from a WTRU. Method 1300 may be performed at a transmitter.

At 1302, reference signals are transmitted from multiple ports of an antenna system, such as described in one or more examples herein. The transmitting may include transmitting beam measurement reference signals from a group of antennas. The reference signal transmissions may be multiplexed in time and beamformed in different directions.

At 1304, feedback is received from a WTRU regarding the reference signals, such as described in one or more examples herein. The WTRU may, for example, be configured to measure the reference signals and feedback information regarding a preferred direction.

At 1306, the transmitter and/or antenna system is configured based on the feedback. The configuring may include constructing and/or configuring a precoder, such as described in one or more examples herein.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Additional Examples are provided below.

An Example 1 is a method that includes constructing a composite precoder ($W_c$) using a function $f(W_n, W_p)$, where ($W_n$) is an extension matrix and ($W_p$) is a panel-specific precoder.

In an Example 2, the function $f(W_n, W_p)$ is determined based on a transmission scheme.

In an Example 3, the function $f(W_n, W_p)$ is determined based on a MIMO operation mode.

In an Example 4, the function $f(W_n, W_p)$ is determined based on an operating frequency band.

In an Example 5, the function $f(W_n, W_p)$ is determined based on a massive antenna configuration.

In an Example 6, the panel-specific precoder $W_p$ includes a plurality of component precoders.

In an Example 7, a first component precoder of $W_p$ is a component precoder for a wideband beam group reporting.

In an Example 8, a second component precoder of $W_p$ is a component precoder for a subband beam selection and co-phasing of polarized antenna ports.

An Example 9 is a method that includes configuring an antenna panel for use with a channel state information reference signal (CSI-RS).

In an Example 10, The method of claim 9, wherein a CSI-RS is configured for each panel in a multi-panel system.

In an Example 11, a CSI-RS configuration includes at least one of:
one or more CSI-RS reuse patterns;
a transmission power of the CSI-RS configuration;
an indication of zero power or non-zero power;
a duty cycle of one or more of the CSI-RS reuse patterns; and
a timing offset of one or more of the CSI-RS reuse patterns.

In an Example 12, a CSI-RS configuration is defined as non-precoded CSI-RS or beamformed CSI-RS.

An Example 13 is a method that includes:
transmitting beam measurement reference signals from a group of antennas where the reference signal transmissions may be multiplexed in time and beamformed in different directions; and
operating a WTRU to measure the reference signals and feedback information regarding a preferred direction.

An Example 14 is a method that includes transmitting a non-precoded CSI-RS may be transmitted from antennas of different panels such that antennas on different panels are virtualized to a common CSI-RS.

An Example 15 is a method that includes transmitting a non-precoded CSI-RS from the antennas of one panel when the panels do not satisfy the condition of being co-located, where non-precoded CSI-RSs from separate panels are multiplexed in time and/or frequency and/or code domains.

An Example 16 is a method that includes configuring one or more quasi-collocation (QCL) types for one or more CSI-RS configurations, where QCL indicates whether two or more of CSI-RS configurations (or CSI-RSs) are quasi-collocated (or assumed to be the same) in terms of at least one of delay spread, Doppler spread, frequency shift, average received power, received timing, and beam index.

In an Example 17, a QCL type indicates whether full or partial QCL parameters are QCL-ed or non-QCL-ed, where if a QCL parameter is QCL-ed it has the same received signal characteristics for the QCL parameters and if a QCL parameter is non-QCL-ed there is a difference in received signal characteristics for the QCL parameters.

An Example 18 is a method that includes configuring a composite precoder $W_c$ as $W_c = W_n \otimes W_p$, where $\otimes$ is a Kronencker product, $W_n$ is a Na×1 vector, and $W_p$ is a Np×R precoding vector/matrix associated with a panel.

In an Example 19, for each panel a wireless transmit/receive unit (WTRU) may determine Wp based on a representative CSI-RS configuration.

In an Example 20, the representative CSI-RS configuration is indicated by a gNB.

In an Example 21, the representative CSI-RS configuration is autonomously determined by the user equipment.

In an Example 22, the user equipment determines Wp to maximize CQI of a composite precoder.

An Example 23 is a method that includes configuring a composite precoder $W_c$ as $W_c(k,i) = W_n(k) W_p(i)$, where $W_n(k)$ is an Nt×Np matrix and $W_p(i)$ is an Np×R vector/matrix.

An Example 24 is a method that includes configuring a composite precoder $W_c$ as a sparse matrix $W_c = W_n \otimes W_p$ wherein $\otimes$, $W_n$ and $W_p$ are Kronencker product, Na×1 panel selection sparse vector and Np×R antenna selection sparse matrix.

An Example 25 is a method that includes configuring a composite precoder $W_c$ as $$W_c = \Sigma_{j=1}^{Na} W_{nj} \otimes W_{pj},$$

where $\otimes$, $W_{nj}$ and $W_{pj}$ are Kronencker product, Na×1 panel selection sparse vector, and Np×R antenna selection sparse matrix.

An Example 26 is a method that includes configuring a composite precoder Wc as $W_c = W_n \otimes (W_p^1 \cdot W_p^2)$, where $\otimes$ is a Kronencker product.

In an Example 27, $$W_p^1 = \begin{pmatrix} X_1 \otimes X_2 & 0 \\ 0 & X_1 \otimes X_2 \end{pmatrix} \text{ or } W_p^1 = \begin{pmatrix} X_1 \otimes X_2 & X_1 \otimes X_2 \\ X_1 \otimes X_2 & -X_1 \otimes X_2 \end{pmatrix}.$$

In an Example 28, $X_1$ is a $N_1 \times L_1$ matrix with $L_1$ column vectors being an $O_1$ oversampled DFT vector of length $$N_1 : v_l = \begin{bmatrix} 1 & e^{\frac{j2\pi l}{N_1 O_1}} & \ldots & e^{\frac{j2\pi(N_1-1)l}{N_1 O_1}} \end{bmatrix}^T.$$

In an Example 29, $X_2$ is a $N_2 \times L_2$ matrix with $L_2$ column vectors being an $O_2$ oversampled DFT vector of length $$N_2 : v_l = \begin{bmatrix} 1 & e^{\frac{j2\pi l}{N_2 O_2}} & \ldots & e^{\frac{j2\pi(N_2-1)l}{N_2 O_2}} \end{bmatrix}^T.$$

In an Example 30, $N_1$ and $N_2$ are the numbers of antenna ports per pol in a first and second dimension.

In an Example 31, $$W_p^2 = \begin{bmatrix} s_1 \\ as_2 \end{bmatrix},$$

$s_1$ and $s_2$ are column selection vectors, and $\alpha$ is a co-phasing element based on a complex number.

In an Example 32, $$s_1 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}, s_2 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\},$$

and $s_1$ and $s_2$ are a linear combination of column vectors in $W_p^1$.

In an Example 33, a first frequency granularity is used for $W_p^1$, a second frequency granularity is used for $W_p^2$, and a third frequency granularity is used for $W_n$.

In an Example 34, the first frequency granularity is equal to or larger than the third frequency granularity.

In an Example 35, the second frequency granularity is equal to or smaller than the third frequency granularity.

In an Example 26, for each of a plurality of panels, a panel p is associated with a CSI-RS configuration.

In an Example 37, for each of a plurality of panels, a panel p is associated with a subset of antenna ports in a CSI-RS configuration.

An Example 38 is a method that includes configuring a composite precoder using one or more of individual panel-specific precoder $W_{p,l}$, where l is a panel index (or CSI-RS configuration index), l=1, ..., Na.

In an Example 39, the composite precoder is configured as $W_c = [W_{p,1} | W_{p,2} | \ldots | W_{p,Na}]$, where '|' represents stacking one or more panel-specific precoders $W_{p,l}$ such that $$W_c = [W_{p,1} | W_{p,2} | \ldots | W_{p,Na}] = \begin{bmatrix} W_{p,1} \\ W_{p,2} \\ \vdots \\ W_{pNa} \end{bmatrix}.$$

In an Example 40, a stacking of panel-specific precoders is configured as $W_c = \text{diag}[C_{p,1} \, C_{p,2} \ldots C_{p,Na}] \cdot W_n$, where $C_{p,l}$ is a precoding vector associated with a panel l without co-phasing across panels, diag[ ] is a block diagonalization of the panel-specific precoders, and $W_n$ is a Na×1 co-phasing vector across panels.

In an Example 41, after co-phasing across panels, each panel-specific precoder is expressed as $W_{p,l}$.

In an Example 42, the co-phasing across panels is reported as $W_{p,l}$.

In an Example 43, the co-phasing across panels is reported separately as $W_n$ with panel-specific precoder $C_{p,l}$.

In an Example 44, each of $W_{p,l}$ has a same precoding structure with component precoders $W_p^1$ and $W_p^2$.

In an Example 45, $W_p^1$ is common for all panels.

In an Example 46, a user equipment reports a single $W_p^1$ for all panels and the user equipment reports $W_{p,l}^2$ for each panel.

In an Example 47, $W_p^1$ is panel-specific.

In an Example 48, a user equipment reports $W_{p,l}^1$ and $W_{p,l}^2$ for each panel.

In an Example 49, $W_n$ is reported with a same frequency granularity with $W_p^1$.

In an Example 50, $W_n$ is reported with a same frequency granularity with $W_p^2$.

In an Example 51, a frequency granularity of $W_n$ is determined based on at least one of:
  an indication in an associated DL control information which is used to trigger aperiodic or semi-persistent CSI reporting;
  a number of panels or a number of CSI-RS configurations associated with a composite precoder;
  a frequency band used; and
  a CSI reporting setting used.

In an Example 52, use of a panel common $W_p^1$ or a panel-specific $W_p^1$ is determined based on at least one of:
  an antenna calibration status across panels, wherein the antenna calibration status is indicated as QCL, such that if predefined QCL parameters are QCL-ed across panels or across CSI-RS configurations, a panel common $W_p^1$ is used, and otherwise a panel-specific $W_p^1$ is used;
  a dynamic indication when CSI reporting is triggered; and
  a higher layer signaling indicating which type of $W_p^1$ is used.

In an Example 53, $C_{p,1}$ is determined based on its associated CSI-RS configuration, and $N_a$ CSI-RS configurations are used for a CSI reporting for a composite codebook.

An Example 54 is a method that includes a user equipment selecting one of a first composite precoder structure $W_c = [W_{p,1} | W_{p,2} | \ldots | W_{p,N_a}]$ and a second composite precoder structure $W_c = W_n \otimes W_p$ based on a QCL type or status.

In an Example 55, the second composite precoder structure is selected if all CSI-RS configurations are QCL-ed for a predefined set of QCL parameters.

In an Example 56, the predefined set of QCL parameters includes a QCL type predefined or a subset of QCL parameters.

In an Example 57, the first composite precoder structure is selected if not all CSI-RS configurations are QCL-ed for a predefined set of QCL parameters.

In an Example 58, the predefined set of QCL parameters comprises a QCL type predefined or a subset of QCL parameters.

In an Example 59, the first composite precoder uses individual reporting of $W_p$ for each panel and the second composite precoder uses common reporting of $W_p$ for all panels.

An Example 60 is a method that includes transmitting an RF signal using a precoder configured according to a method of any of Examples 1-59.

An Example 61 is a method that includes:
  transmitting a first signal from one or more of ports of a multiple port antenna system, wherein each port corresponds to a respective set of one or more radiation elements of the antenna system;
  receiving feedback from a receiver of the first signal, wherein the feedback relates to channel state information (CSI) of the one or more of the ports;
  precoding a second signal based on the feedback; and
  transmitting the pre-coded second signal from the antenna system.

In an Example 62, the first signal includes one or more of:
  a reuse pattern;
  an indication of transmission power;
  an indication of a duty cycle of the reuse pattern; and
  an indication of a timing offset of the reuse pattern.

In an Example 63, the precoding includes:
  precoding the second signal based further on a composite precoder Wc that is a function of a port selector matrix Wn and a port-specific precoder Wp.

In an Example 64, the precoding includes dynamically configuring composite precoder Wc.

In an Example 65, the port-specific precoder Wp is a function of first and second component precoders, the first component precoder is configured for wideband beam group reporting, and the second component precoder is configured for sub-band beam selection and co-phasing of polarized ports.

In an Example 66:
  the composite precoder $W_c$ is equal to $W_n \otimes W_p$,
  $\otimes$ represents a Kronecker product,
  $W_p = W_p^1 \cdot W_p^2$,
  $W_p^1$ is one of $$\begin{pmatrix} X_1 \otimes X_2 & 0 \\ 0 & X_1 \otimes X_2 \end{pmatrix} \text{ and } \begin{pmatrix} X_1 \otimes X_2 & X_1 \otimes X_2 \\ X_1 \otimes X_2 & -X_1 \otimes X_2 \end{pmatrix};$$

$X_1$ is a $N_1 \times L_1$ matrix with $L_1$ column vectors being an $O_1$ oversampled DFT vector of length $$N_1 : v_l = \begin{bmatrix} 1 & e^{\frac{j2\pi l}{N_1 O_1}} & \ldots & e^{\frac{j2\pi(N_1-1)l}{N_1 O_1}} \end{bmatrix}^T;$$

$X_2$ is a $N_2 \times L_2$ matrix with $L_2$ column vectors being an $O_2$ oversampled DFT vector of length $$N_2 : v_l = \begin{bmatrix} 1 & e^{\frac{j2\pi l}{N_2 O_2}} & \ldots & e^{\frac{j2\pi(N_2-1)l}{N_2 O_2}} \end{bmatrix}^T;$$

$N_1$ is a number of antenna ports per pol in a first dimension; and
$N_2$ is a number of antenna ports per pol in a second dimension.

In an Example 67:

$$W_p^2 = \begin{bmatrix} s_1 \\ \alpha s_2 \end{bmatrix},$$

$s_1$ and $s_2$ are respective column selection vectors, and
$\alpha$ is a co-phasing element based on a complex number.

In an Example 68:

$$s_1 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}, \text{ and } s_2 \in \left\{ \begin{bmatrix} 1 \\ 0 \\ \vdots \\ 0 \end{bmatrix}, \begin{bmatrix} 0 \\ 1 \\ \vdots \\ 0 \end{bmatrix}, \ldots, \begin{bmatrix} 0 \\ 0 \\ \vdots \\ 1 \end{bmatrix} \right\}.$$

In an Example 69:

$$W_p^2 = \begin{bmatrix} s_1 \\ \alpha s_2 \end{bmatrix};$$

and $s_1$ and $s_2$ are a linear combination of column vectors in $W_p^1$.

In an Example 70, the precoding further includes:
using a first frequency granularity for $W_p^1$ and a second frequency granularity for $W_p^2$, wherein the first and second frequency granularities differ from one another.

In an Example 71:
the port selector matrix Wn is a function of a first sub-component precoder $W_n^1$ and a second sub-component precoder $W_n^2$;
the first sub-component precoder $W_n^1$ is configured to determine a subset co-phasing vectors; and
the second sub-component precoder $W_n^2$ is configured to determine a co-phasing vector within the subset of co-phasing vectors determined by first sub-component precoder $W_n^1$.

In an Example 72, $W_n^1$ includes a subset of an over-sampled DFT matrix, a grassmanian based codebook, and a codebook.

In an Example 73, $W_n^2$ includes a column selection vector.

In an Example 74:
$W_n^1$ is configured as a long-term, wideband based precoder; and
$W_n^2$ is configured as a short-term, sub-band based precoder.

In an Example 75, the function of Example 63 is based on one or more of a transmission scheme, a transmission frequency band, a loop mode of operation, and a number of ports of the antenna system.

In an Example 76:
the transmitting includes transmitting beam measurement reference signals from a group of ports, multiplexing the beam measurement reference signal transmissions in time, and beamforming the beam measurement reference signal transmissions in multiple directions; and
the receiving includes receiving feedback from the receiver indicative of a preferred one of the directions.

In an Example 77:
the antenna system includes multiple panels of radiation elements;
the transmitting includes transmitting the first signal from one or more ports of a first one of the panels;
the receiving includes receiving feedback from the receiver regarding CSI of the first panel; and
the precoding includes utilizing the feedback regarding CSI of the first panel as feedback regarding CSI of a second one of the panels, if a distance between the first and second panels is less than a threshold distance.

In an Example 78:
the receiving further includes receiving feedback regarding one or more of delay spread, Doppler spread, frequency shift, average received power, received timing (time of arrival?), and beam index of the first panel; and
the utilizing includes utilizing the feedback regarding the one or more of delay spread, Doppler spread, frequency shift, average received power, received timing, and beam index of the first panel as feedback regarding the second panel, if the distance between the first and second panels is less than the threshold distance.

In an Example 79, the transmitting further includes:
transmitting first and second non-precoded reference signals from respective ones of the first and second panels if the first and second panels are not within the threshold distance of one another; and
multiplexing the first and second non-precoded reference signals in one or more of time, frequency, and code domains.

An Example 80 is a method of configuring an antenna system that includes, at wireless transmit/receive unit (WTRU):
receiving a configuration of a plurality of reference signal (RS) resources;
receiving information identifying a quasi-collocation (QCL) type for a subset of the RS resources, wherein the subset of the RS resources includes a first RS resource and a second RS resource;
receiving an indication to use the first RS resource for demodulation of a downlink (DL) data transmission;
determining a first set of QCL parameters associated with the identified QCL type by measuring reference signals from the subset of RS resources;
determining a second set of QCL parameters which are not in the first set of QCL parameters by measuring reference signals from the first RS resource;
demodulating the DL data using the first and second sets of QCL parameters.

An Example 81 is an apparatus to perform the method of any of Examples 1-80.

An Example 82 is an apparatus comprising means for performing the method of any one of claims 1-80.

An Example 83 is at least one machine readable medium comprising a plurality of instructions that, when executed on a computing device, cause the computing device to carry out a method according to any one of claims 1-80.

An Example 84 is a computer system to perform the method of any of claims 1-80.

An Example 85 is a computing device comprising a chipset according to any one of claims 1-80.

An Example 86 is a non-transitory computer readable medium encoded with a computer program that includes instructions to cause a processor to perform the method of any one of claims 1-80.

An Example 87 is a processor and memory configured to perform the method of any one of claims 1-80.

The invention claimed is:

1. A method implemented in a wireless transmit/receive unit (WTRU), the method comprising:
receiving one or more transmissions comprising information indicating, for a plurality of reference signal resource configurations, a respective plurality of one or more resources, wherein:
the one or more resources indicated for a first channel state information reference signal resource configuration of the plurality of reference signal resource configurations comprise a first channel state information reference signal and a first periodicity; and
the one or more resources indicated for a second channel state information reference signal resource configuration of the plurality of reference signal resource configurations comprise a second channel state information reference signal and a second periodicity;
receiving one or more radio resource control transmissions comprising quasi collocation type information, wherein:
the quasi collocation type information indicates first and second sets of quasi collocation parameters;
the first set of quasi collocation parameters is associated with the first channel state information reference signal resource configuration;
the second set of quasi collocation parameters is associated with the second channel state information reference signal resource configuration;

the second set of quasi collocation parameters comprises one or more quasi collocation parameters in common with the first set of quasi collocation parameters;

the first set of quasi collocation parameters comprises at least one quasi collocation parameter different from the second set of quasi collocation parameters; and each of the first and second sets of quasi collocation parameters comprise a subset of a larger set of quasi collocation parameters;

receiving downlink control information associated with a downlink data transmission, wherein the downlink control information comprises information indicating a quasi collocation relationship between the first channel state information reference signal resource configuration and a downlink reference signal associated with the downlink data transmission;

determining values for the first set of quasi collocation parameters from measured signal characteristics of the first channel state information reference signal;

determining respective one or more values for the one or more quasi collocation parameters in common with the first set of quasi collocation parameters from measured signal characteristics of the second channel state information reference signal; and decoding the downlink data using the downlink reference signal, the determined values of the first set of quasi collocation parameters and the determined one or more values of the one or more quasi collocation parameters in common with the first set of quasi collocation parameters.

2. The method of claim 1, wherein the larger set of quasi collocation parameters comprises a delay spread, a Doppler spread, a frequency shift, a received timing, and a spatial receive parameter.

3. The method of claim 1, wherein the first set of quasi collocation parameters comprises two or more of a delay spread, a Doppler spread, a frequency shift and a received timing.

4. The method of claim 1, wherein:
the first and second channel state information reference signal configurations are associated with a given layer of multiple layers for multi-layer transmission.

5. The method of claim 1, wherein the second set of quasi collocation parameters comprises one or more of a Doppler spread, a frequency shift and a received timing.

6. The method of claim 1, wherein the downlink reference signal is a downlink demodulation reference signal.

7. The method of claim 1, wherein:
the first channel state information reference signal resource configuration is associated with a first channel state information feedback determined based on a measurement of a single transmission of the first channel state information reference signal; and
the second channel state information reference signal resource configuration is associated with a second channel state information feedback determined based on measurements of multiple transmissions of the second channel state information reference signal.

8. The method of claim 1, wherein each of the first periodicity and second periodicity is one of aperiodic and periodic.

9. The method of claim 8, wherein the first periodicity and second periodicity are aperiodic and periodic, respectively.

10. At least one machine readable non-transitory medium comprising a plurality of instructions that, when executed on a computing device, cause the computing device to carry out a method comprising:

receiving one or more transmissions comprising information indicating, for a plurality of reference signal resource configurations, a respective plurality of one or more resources, wherein:
the one or more resources indicated for a first channel state information reference signal resource configuration of the plurality of reference signal resource configurations comprise a first channel state information reference signal and a first periodicity; and
the one or more resources indicated for a second channel state information reference signal resource configuration of the plurality of reference signal resource configurations comprise a second channel state information reference signal and a second periodicity;

receiving one or more radio resource control transmission comprising quasi collocation type information, wherein:
the quasi collocation type information indicates first and second sets of quasi collocation parameters;
the first set of quasi collocation parameters is associated with the first channel state information reference signal resource configuration;
the second set of quasi collocation parameters is associated with the second channel state information reference signal resource configuration;
the second set of quasi collocation parameters comprises one or more quasi collocation parameters in common with the first set of quasi collocation parameters;
the first set of quasi collocation parameters comprises at least one quasi collocation parameter different from the second set of quasi collocation parameters; and
each of the first and second sets of quasi collocation parameters comprise a subset of a larger set of quasi collocation parameters;

receiving downlink control information associated with a downlink data transmission, wherein the downlink control information comprises information indicating a quasi collocation relationship between the first channel state information reference signal resource configuration and a downlink reference signal associated with the downlink data transmission;

determining values for the first set of quasi collocation parameters from measured signal characteristics of the first channel state information reference signal;

determining respective one or more values for the one or more quasi collocation parameters in common with the first set of quasi collocation parameters from measured signal characteristics of the second channel state information reference signal; and decoding the downlink data using the downlink reference signal, the determined values of the first set of quasi collocation parameters and the determined one or more values of the one or more quasi collocation parameters in common with the first set of quasi collocation parameters.

11. The at least one machine readable non-transitory medium of claim 10, wherein at least one of:
the larger set of quasi collocation parameters comprises a delay spread, a Doppler spread, a frequency shift, a received timing, and a spatial receive parameter;

the first set of quasi collocation parameters comprises two or more of a delay spread, a Doppler spread, a frequency shift and a received timing;

the second set of quasi collocation parameters comprises one or more of a Doppler spread, a frequency shift and a received timing;

each of the first periodicity and second periodicity is one of aperiodic and periodic; and the first periodicity and second periodicity are aperiodic and periodic, respectively.

12. A wireless transmit/receive unit (WTRU) comprising circuitry, including a transmitter, a receiver, a processor and memory storing a plurality of instructions executable by the processor, configured to:

receive one or more transmissions comprising information indicating, for a plurality of reference signal resource configurations, a respective plurality of one or more resources, wherein:

the one or more resources indicated for a first channel state information reference signal resource configuration of the plurality of reference signal resource configurations comprise a first channel state information reference signal and a first periodicity; and the one or more resources indicated for a second channel state information reference signal resource configuration of the plurality of reference signal resource configurations comprise a second channel state information reference signal and a second periodicity;

receive one or more radio resource control transmission comprising quasi collocation type information, wherein:

the quasi collocation type information indicates first and second sets of quasi collocation parameters;

the first set of quasi collocation parameters is associated with the first channel state information reference signal resource configuration;

the second set of quasi collocation parameters is associated with the second channel state information reference signal resource configuration;

the second set of quasi collocation parameters comprises one or more quasi collocation parameters in common with the first set of quasi collocation parameters;

the first set of quasi collocation parameters comprises at least one quasi collocation parameter different from the second set of quasi collocation parameters; and each of the first and second sets of quasi collocation parameters comprise a subset of a larger set of quasi collocation parameters;

receive downlink control information associated with a downlink data transmission, wherein the downlink control information comprises information indicating a quasi collocation relationship between the first channel state information reference signal resource configuration and a downlink reference signal associated with the downlink data transmission;

determine values for the first set of quasi collocation parameters from measured signal characteristics of the first channel state information reference signal;

determine respective one or more values for the one or more quasi collocation parameters in common with the first set of quasi collocation parameters from measured signal characteristics of the second channel state information reference signal; and decode the downlink data using the downlink reference signal, the determined values of the first set of quasi collocation parameters and the determined one or more values of the one or more quasi collocation parameters in common with the first set of quasi collocation parameters.

13. The WTRU of claim 12, wherein the larger set of quasi collocation parameters comprises a delay spread, a Doppler spread, a frequency shift, a received timing, and a spatial receive parameter.

14. The WTRU of claim 12, wherein the first set of quasi collocation parameters comprises two or more of a delay spread, a Doppler spread, a frequency shift and a received timing.

15. The WTRU of claim 12, wherein:
the first and second channel state information reference signal configurations are associated with a given layer of multiple layers for multi-layer transmission.

16. The WTRU of claim 12, wherein the second set of quasi collocation parameters comprises one or more of a Doppler spread, a frequency shift and a received timing.

17. The WTRU of claim 12, wherein the downlink reference signal is a downlink demodulation reference signal.

18. The WTRU of claim 12, wherein:
the first channel state information reference signal resource configuration is associated with a first channel state information feedback determined based on a measurement of a single transmission of the first channel state information reference signal; and the second channel state information reference signal resource configuration is associated with a second channel state information feedback determined based on measurements of multiple transmissions of the second channel state information reference signal.

19. The WTRU of claim 12, wherein each of the first periodicity and second periodicity is one of aperiodic and periodic.

20. The WTRU of claim 19, wherein the first periodicity and second periodicity are aperiodic and periodic, respectively.

* * * * *